US012550153B2

(12) United States Patent
Gao et al.

(10) Patent No.: US 12,550,153 B2
(45) Date of Patent: Feb. 10, 2026

(54) SINGLE FREQUENCY NETWORK BASED PDCCH DIVERSITY OVER MULTIPLE TRPs

(71) Applicant: Telefonaktiebolaget LM Ericsson (publ), Stockholm (SE)

(72) Inventors: Shiwei Gao, Nepean (CA); Mattias Frenne, Uppsala (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 265 days.

(21) Appl. No.: 18/019,837

(22) PCT Filed: Aug. 3, 2021

(86) PCT No.: PCT/IB2021/057104
§ 371 (c)(1),
(2) Date: Feb. 6, 2023

(87) PCT Pub. No.: WO2022/029627
PCT Pub. Date: Feb. 10, 2022

(65) Prior Publication Data
US 2023/0284235 A1    Sep. 7, 2023

Related U.S. Application Data

(60) Provisional application No. 63/062,837, filed on Aug. 7, 2020.

(51) Int. Cl.
*H04W 72/23* (2023.01)
*H04B 7/06* (2006.01)
*H04L 5/00* (2006.01)

(52) U.S. Cl.
CPC ........ *H04W 72/23* (2023.01); *H04B 7/06968* (2023.05); *H04L 5/0051* (2013.01)

(58) Field of Classification Search
CPC ........... H04W 52/365; H04W 72/0446; H04W 72/1289; H04W 72/23; H04W 72/044;
(Continued)

(56) References Cited

U.S. PATENT DOCUMENTS 9,924,502 B2    3/2018    Choi et al.
11,601,824 B2   3/2023    Hamidi-Sepehr et al.
(Continued)

FOREIGN PATENT DOCUMENTS

CA      3050207 A1    1/2020
CN      108352945 A   7/2018
(Continued)

OTHER PUBLICATIONS

Author Unknown, "Technical Specification Group Radio Access Network; NR; Physical channels and modulation (Release 15)," Technical Specification 38.211, Version 15.6.0, Jun. 2019, 3GPP Organizational Partners, 97 pages.
(Continued)

*Primary Examiner* — Wei Zhao
(74) *Attorney, Agent, or Firm* — Withrow & Terranova, PLLC

(57) ABSTRACT

Single Frequency Network (SFN) based Physical Downlink Control Channel (PDCCH) diversity over multiple Transmission/Reception Points (TRPs) is disclosed. More specifically, methods performed by a wireless device(s) and a base station(s) are provided. The methods disclosed herein make it possible for the wireless device(s) to receive PDCCH transmission from another one of the multiple TRPs, based on Control-Channel Elements (CCEs) transmitted from all of the multiple TRPs, when one of the multiple TRPs is blocked.

23 Claims, 14 Drawing Sheets

(58) Field of Classification Search
CPC ............... H04W 72/128; H04L 5/0051; H04L 5/0023; H04L 5/005
See application file for complete search history.

(56) References Cited

U.S. PATENT DOCUMENTS

| | | | |
|---|---|---|---|
| 2011/0235601 A1 | 9/2011 | Yoo et al. | |
| 2013/0252606 A1* | 9/2013 | Nimbalker | H04B 17/309 455/434 |
| 2018/0279360 A1 | 9/2018 | Park et al. | |
| 2019/0182807 A1 | 6/2019 | Panteleev et al. | |
| 2019/0222357 A1 | 7/2019 | Huang et al. | |
| 2019/0222400 A1 | 7/2019 | Bagheri et al. | |
| 2019/0253308 A1 | 8/2019 | Huang et al. | |
| 2019/0253904 A1 | 8/2019 | Tsai et al. | |
| 2019/0305909 A1 | 10/2019 | Chien et al. | |
| 2019/0373450 A1 | 12/2019 | Zhou et al. | |
| 2020/0008235 A1 | 1/2020 | Sarkis et al. | |
| 2020/0029316 A1 | 1/2020 | Zhou et al. | |
| 2020/0052844 A1 | 2/2020 | Yu et al. | |
| 2020/0100154 A1 | 3/2020 | Cirik et al. | |
| 2020/0106559 A1 | 4/2020 | Vilaipornsawai et al. | |
| 2020/0145062 A1 | 5/2020 | Jung et al. | |
| 2020/0145982 A1 | 5/2020 | Cheng et al. | |
| 2020/0153497 A1 | 5/2020 | Tsai et al. | |
| 2020/0153572 A1 | 5/2020 | Tsai et al. | |
| 2020/0154467 A1 | 5/2020 | Gong et al. | |
| 2020/0314858 A1 | 10/2020 | Xu et al. | |
| 2020/0351896 A1 | 11/2020 | Taherzadeh Boroujeni et al. | |
| 2021/0028843 A1* | 1/2021 | Zhou | H04L 5/0053 |
| 2021/0058971 A1 | 2/2021 | MolavianJazi et al. | |
| 2021/0119688 A1* | 4/2021 | Enescu | H04B 7/088 |
| 2021/0144744 A1 | 5/2021 | Zhou et al. | |
| 2021/0184738 A1 | 6/2021 | Bai et al. | |
| 2021/0195600 A1 | 6/2021 | Khoshnevisan et al. | |
| 2021/0226820 A1 | 7/2021 | Khoshnevisan et al. | |
| 2021/0227418 A1 | 7/2021 | Hwang et al. | |
| 2021/0227525 A1 | 7/2021 | Khoshnevisan et al. | |
| 2021/0258928 A1 | 8/2021 | Khoshnevisan et al. | |
| 2021/0320753 A1 | 10/2021 | Shimezawa et al. | |
| 2021/0321446 A1 | 10/2021 | Lee et al. | |
| 2021/0329611 A1 | 10/2021 | Karjalainen et al. | |
| 2023/0023041 A1 | 1/2023 | Yi et al. | |
| 2023/0040433 A1 | 2/2023 | Zhang et al. | |
| 2023/0106244 A1 | 4/2023 | Yu et al. | |
| 2023/0198721 A1 | 6/2023 | Gao et al. | |
| 2023/0209561 A1 | 6/2023 | Matsumura et al. | |
| 2024/0031067 A1 | 1/2024 | Gao et al. | |

FOREIGN PATENT DOCUMENTS

| | | |
|---|---|---|
| CN | 110352578 A | 10/2019 |
| CN | 110365458 A | 10/2019 |
| CN | 110535570 A | 12/2019 |
| CN | 110839290 A1 | 2/2020 |
| CN | 111031603 A | 4/2020 |
| CN | 111106907 A | 5/2020 |
| CN | 111106914 A | 5/2020 |
| CN | 111148239 A | 5/2020 |
| CN | 111436224 A | 7/2020 |
| EP | 3809650 A1 | 4/2021 |
| WO | 2018045092 A1 | 3/2018 |
| WO | 2018228487 A1 | 12/2018 |
| WO | 2019139955 A1 | 7/2019 |
| WO | 201924422 A1 | 12/2019 |
| WO | 2019244223 A1 | 12/2019 |
| WO | 2020033549 A1 | 2/2020 |
| WO | 2020033647 A1 | 2/2020 |
| WO | 2020054036 A1 | 3/2020 |
| WO | 2020064512 A1 | 4/2020 |
| WO | 2020080916 A1 | 4/2020 |
| WO | 2020098737 A1 | 5/2020 |
| WO | 2020153809 A1 | 7/2020 |
| WO | 2021156790 A1 | 8/2021 |
| WO | 2021234678 A2 | 11/2021 |
| WO | 2021250637 A1 | 12/2021 |

OTHER PUBLICATIONS

Author Unknown, "Technical Specification Group Radio Access Network; NR; Physical channels and modulation (Release 16)," Technical Specification 38.211, Version 16.0.0, Dec. 2019, 3GPP Organizational Partners, 129 pages.
Author Unknown, "Technical Specification Group Radio Access Network; NR; Physical channels and modulation (Release 16)," Technical Specification 38.211, Version 16.1.0, Mar. 2020, 3GPP Organizational Partners, 130 pages.
Author Unknown, "Technical Specification Group Radio Access Network; NR; Multiplexing and channel coding (Release 16)," Technical Specification 38.212, Version 16.0.0, Dec. 2019, 3GPP Organizational Partners, 145 pages.
Author Unknown, "Technical Specification Group Radio Access Network; NR; Multiplexing and channel coding (Release 16)," Technical Specification 38.212, Version 16.1.0, Mar. 2020, 3GPP Organizational Partners, 146 pages.
Author Unknown, "Technical Specification Group Radio Access Network; NR; Physical layer procedures for control (Release 15)," Technical Specification 38.213, Version 1.0.2, Oct. 2017, 3GPP Organizational Partners, 23 pages.
Author Unknown, "Technical Specification Group Radio Access Network; NR; Physical layer procedures for control (Release 15)," Technical Specification 38.213, Version 15.4.0, Dec. 2018, 3GPP Organizational Partners, 104 pages.
Author Unknown, "Technical Specification Group Radio Access Network; NR; Physical layer procedures for control (Release 16)," Technical Specification 38.213, Version 16.1.0, Mar. 2020, 3GPP Organizational Partners, 156 bages.
Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
Author Unknown, "Technical Specification Group Radio Access Network; NR: Medium Access Control (MAC) protocol specification (Release 16)," Technical Specification 38.321, Version 16.0.0, Mar. 2020, 3GPP Organizational Partners, 141 pages.
Author Unknown, "Technical Specification Group Radio Access Network; NR; Radio Resource Control (RRC) protocol specification (Release 15)," Technical Specification 38.331, Version 15.1.0, Mar. 2018, 3GPP Organizational Partners, 268 pages.
Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.
Catt, "R1-1801750: Discussion on enhanced PDCCH for NR URLLC," 3GPP TSG RAN WG1 Meeting #92, Feb. 26-Mar. 2, 2018, 4 pages.
Catt, "R1-1900339: Consideration on multi-TRP/panel transmission," 3GPP TSG RAN WG1 Ad-Hoc Meeting 1901, Jan. 21-25, 2019, Taipei, Taiwan, 14 pages.
Catt, "R1-1904561: Consideration on multi-TRP/panel transmission," 3GPP TSG RAN WG1 #96bis, Apr. 8-12, 2019, Xi'an, China, 14 pages.
Ericsson, "R1-1900728: On multi-TRP and multi-panel," 3GPP TSG RAN WG1 Meeting Ad-Hoc Meeting 1901, Jan. 21-25, 2019, Taipei, Taiwan, 9 pages.
Ericsson, "R1-1909423: Preliminary results on PDCCH over multi-TRP for URLLC," 3GPP TSG RAN WG1 Meetin RAN1#98, Aug. 26-30, 2019, Prague, Czech Republic, 4 pages.
Nokia, et al., "R1-1813489: Enhancements on Multi-TRP/Panel Transmission," 3GPP TSG RAN WG1 Meeting #95, Nov. 12-16, 2018, Spokane, Washington, 18 pages.

(56) References Cited

OTHER PUBLICATIONS

NTT Docomo, et al., "R1-1805063: Necessity of PDCCH repitition," 3GPP TSG RAN WG1 Meeting #92bis, Apr. 16-20, 2018, Sanya, China, 6 pages.
NTT Docomo, et al., "R1-1911184: Enhancements on multi-TRP/panel transmission," 3GPP TSG RAN WG1 #98bis, Oct. 14-20, 2019, Chongqing, China, 32 pages.
Spreadtrum Communications, "R1-1900711: Discussion on Multi-TRP transmission," 3GPP TSG RAN WG1 Meeting #AH1901, Jan. 21-25, 2019, Taipei, Taiwan, 6 pages.
Vivo, "R1-1803847: Discussion on PDCCH repetition for URLLC," 3GPP TSG RAN WG1 Meeting #92bis, Apr. 16-20, 2018, Sanya, China, 6 pages.
Zte, "R1-1906244: Considerations on beam management for multi-TRP," 3GPP TSG RAN WG1 #97, May 13-17, 2019, Reno, Nevada, 7 pages.
Zte, et al., "R2-2001465: Consideration on TCI state MAC CE for mTRP mPDCCH transmissions," 3GPP TSG-RAN WG2 #108, Feb. 14, 2020, 4 pages.
International Search Report and Written Opinion for International Patent Application No. PCT/EP2019/075223, mailed Jan. 8, 2020, 10 pages.
International Search Report and Written Opinion for International Patent Application No. PCT/IB2021/050917, mailed May 10, 2021, 15 pages.
Invitation to Pay Additional Fees and Partial Search for International Patent Application No. PCT/IB2021/054465, mailed Jul. 20, 2021, 27 pages.
International Search Report and Written Opinion for International Patent Application No. PCT/IB2021/054465, mailed Sep. 17, 2021, 28 pages.
International Search Report and Written Opinion for International Patent Application No. PCT/IB2021/055182, mailed Sep. 21, 2021, 22 pages.
International Preliminary Report on Patentability for International Patent Application No. PCT/IB2021/055182, mailed May 30, 2022, 28 pages.
Author Unknown, "Technical Specification Group Radio Access Network; NR; Requirements for support of radio resource management (Release 15)," Technical Specification 38.133, Version 15.10.0, Jun. 2020, 3GPP Organizational Partners, 1,161 pages.
Ericsson, "R4-2007382: Transmission scheme in NR PDSCH demodulation requirements for HST," 3GPP TSG-RAN WG4 Meeting #95-e, May 25-Jun. 5, 2020, Electronic Meeting, 3 pages.
Huawei, et al., "R4-1912745: Further discussion on scenarios and transmission schemes for NR Rel-16 HST," 3GPP TSG-RAN WG4 Meeting #92Bis, Oct. 14-18, 2019, Chongqing, China, 4 pages.
Xiaomi, "R1-1902865: Enhancements on Multi-TRP/Panel Transmission," 3GPP TSG RAN WG1 #96, Feb. 25-Mar. 1, 2019, Athens, Greece, 4 pages.
International Search Report and Written Opinion for International Patent Application No. PCT/IB2021/057104, mailed Oct. 26, 2021, 14 pages.
Written Opinion for International Patent Application No. PCT/IB2021/057104, mailed Aug. 31, 2022, 6 pages.
International Preliminary Report on Patentability for International Patent Application No. PCT/IB2021/057104, mailed Nov. 22, 2022, 18 pages.
Catt, "R1-1902019: Consideration on multi-TRP/panel transmission," 3GPP TSG RAN WG1 Meeting #96, Feb. 25-Mar. 1, 2019, Athens, Greece, 11 pages.
Ericsson, "R1-2004633: High Level Views on Rel-17 feMIMO," 3GPP TSG-RAN WG1 Meeting #101-e, May 25-Jun. 5, 2020, Electronic Meeting, 13 pages.
Ericsson, "R1-2006367: On PDCCH, PUCCH and PUSCH robustness," 3GPP TSG-RAN WG1 Meeting #102, Aug. 17-28, 2020, 3GPP TSG-RAN WG1 Meeting #102, Aug. 17-28, 2020, Electronic Meeting 12 pages.
NTT Docomo, Inc., "R1-1900969: PDCCH enhancement for URLLC," 3GPP TSG RAN WG1 Ad-Hoc Meeting 1901, Jan. 21-25, 2019, Taipei, Taiwan, 10 pages.
Qualcomm Incorporated, "R2-2003252: Correction on new DL MIMO MAC CE," 3GPP TSG-RAN WG2 Meeting #109-bis-e, Apr. 20-30, 2020, Electronic Meeting, 10 pages.
Examination Report for European Patent Application No. 21729016.2, mailed Mar. 27, 2024, 5 pages.
Examination Report for European Patent Application No. 21733556.1, mailed Mar. 13, 2024, 4 pages.
Notice of Reasons for Refusal for Japanese Patent Application No. 2022-576204, mailed Mar. 18, 2024, 6 pages.
Decision to Grant for Japanese Patent Application No. 2023-507890, mailed Apr. 2, 2024, 31 pages.
Ericsson, "R1-2004432: Remaining issues on Multi-TRP/Panel Transmission," 3GPP TSG-RAN WG1 Meeting #101-e, May 25-Jun. 5, 2020, Electronic Meeting, 22 pages.
Samsung, "R1-2003918: On Rel. 17 FeMIMO WI," 3GPP TSG RAN WG1 #101, May 25-Jun. 5, 2020, Electronic Meeting, 12 pages.
Vivo, "R1-1717483: NR PDCCH structure," 3GPP TSG RAN WG1 Meeting #90bis, Oct. 9-13, 2017, Prague, Czech Republic, 10 pages.
Notice of Reasons for Rejection for Japanese Patent Application No. 2022-570273, mailed Dec. 5, 2023, 10 pages.
Examination Report No. 1 for Australian Patent Application No. 2021288808, mailed Jul. 7, 2023, 2 pages.
Non-Final Office Action for U.S. Appl. No. 17/279,656, mailed Dec. 7, 2023, 18 pages.
Non-Final Office Action for U.S. Appl. No. 17/797,634, mailed Sep. 24, 2024, 11 pages.
Intel Corporation, "R2-2106645: [AT114-e][035][feMIMO] TCI states indication for PDCCH," 3GPP TSG-RAN WG2 #114-e, May 19-27, 2021, Electronic Meeting, 6 pages.
Decision to Grant for Japanese Patent Application No. 2022-576204, mailed Aug. 9, 2024, 7 pages.
Notice of Allowance for U.S. Appl. No. 17/279,656, mailed Aug. 22, 2024, 7 pages.
Li, Xiaowen, et al., "Implementation of DCI Format Detection and Transmission Scheme Confirmation of PDSCH in LTE System," Television Technology, vol. 17, Sep. 2, 2013, 6 pages.
Intention to Grant for European Patent Application No. 21755064.9, mailed Apr. 16, 2025, 5 pages.
First Office Action for Chinese Patent Application No. 202180068735.6, mailed Jul. 26, 2025, 25 pages.
NTT Docomo, "RP-171137: Status Report of WI on New Radio Access Technology," 3GPP TSG RAN meeting #76, Jun. 5-8, 2017, West Palm Beach, Florida, 218 pages.
Dubey, et al., "Coreset-Based Neural Network Compression," ECCV, Jan. 1, 2018, Computer Vision Foundation, 16 pages.

\* cited by examiner

SINGLE FREQUENCY NETWORK BASED PDCCH DIVERSITY OVER MULTIPLE TRPs

RELATED APPLICATIONS

This application is a 35 U.S.C. § 371 national phase filing of International Application No. PCT/IB2021/057104, filed Aug. 3, 2021, which claims the benefit of provisional patent application Ser. No. 63/062,837, filed Aug. 7, 2020, the disclosures of which are hereby incorporated herein by reference in its entirety their entireties.

TECHNICAL FIELD

The technology of the disclosure relates generally to enabling Single Frequency Network (SFN) based Physical Downlink Control Channel (PDCCH) diversity.

BACKGROUND

New Radio (NR) Frame Structure and Resource Grid

NR uses Cyclic Prefix (CP)-Orthogonal Frequency Division Multiplexing (OFDM) (CP-OFDM) in both downlink (i.e., from a network node, gNB, or base station, to a User Equipment (UE) and uplink (i.e., from UE to gNB). Discrete Fourier Transform (DFT) spread OFDM is also supported in the uplink. In the time domain, NR downlink and uplink are organized into equally-sized subframes of 1 ms each. A subframe is further divided into multiple slots of equal duration. The slot length depends on subcarrier spacing. For subcarrier spacing of $\Delta f=15$ kHz, there is only one slot per subframe and each slot consists of 14 OFDM symbols.

Data scheduling in NR is typically on a slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15\times 2^\mu)$ kHz where $\mu \in 0,1,2,3,4$. $\Delta f=15$ kHz is the basic subcarrier spacing. The slot durations at different subcarrier spacings is given by $$\frac{1}{2^\mu} \text{ms}.$$

In the frequency domain, a system bandwidth is divided into Resource Blocks (RBs), each corresponding to 12 contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one Resource Element (RE).

Downlink (DL) transmissions are dynamically scheduled, i.e., in each slot the gNB transmits Downlink Control Information (DCI) over PDCCH about which UE data is to be transmitted to and which RBs in the current downlink slot the data is transmitted on. The UE data are carried on PDSCH.

There are three DCI formats defined for scheduling PDSCH in NR, i.e., DCI format 1_0, DCI format 1_1, and DCI format 1_2. DCI format 1_0 has a smallest size and can be used when a UE is not fully connected to the network while DCI format 1_1 can be used for scheduling Multiple-Input-Multiple-Output (MIMO) transmissions with 2 Transport Blocks (TBs). DCI format 1_2 supports configurable sizes for some fields in the DCI so that a smaller DCI size than DCI format 1_1 can be configured.

In downlink, a UE first detects and decodes a PDCCH and if the decoding is successful, the UE then decodes the corresponding PDSCH based on the decoded control information in the PDCCH.

Similar to downlink, a UE first decodes uplink grants in a PDCCH and then transmits data over PUSCH based the decoded control information in the uplink grant such as modulation order, coding rate, uplink resource allocation, etc.

Quasi Co-Located (QCL) and Transmit Configuration Indicator (TCI) States

Several signals can be transmitted from different antenna ports of a same base station. These signals can have the same large-scale properties such as Doppler shift/spread, average delay spread, or average delay. These antenna ports are then said to be QCL.

If the UE knows that two antenna ports are QCL with respect to a certain parameter (e.g., Doppler spread), the UE can estimate that parameter based on one of the antenna ports and apply that estimate for receiving signal on the other antenna port. Typically, the first antenna port is represented by a measurement reference signal such as Channel State Information (CSI)-Reference Signal (RS) (CSI-RS) or Synchronization Signal Block (SSB), known as source RS, and the second antenna port is a Demodulation Reference Signal (DMRS), known as target RS.

For instance, if antenna ports A and B are QCL with respect to average delay, the UE can estimate the average delay from the signal received from antenna port A and assume that the signal received from antenna port B has the same average delay. This is useful for demodulation since the UE can know beforehand the properties of the channel, which for instance helps the UE in selecting an appropriate channel estimation filter.

Information about what assumptions can be made regarding QCL is signaled to the UE from the network. In NR, four types of QCL relations between a transmitted source RS and transmitted target RS were defined:
- Type A: {Doppler shift, Doppler spread, average delay, delay spread}
- Type B: {Doppler shift, Doppler spread}
- Type C: {average delay, Doppler shift}
- Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them.

A UE can be configured through Radio Resource Control (RRC) signaling with up to 128 TCI states for PDSCH in Frequency Range 2 (FR2) and up to 8 in FR1, depending on UE capability.

Each TCI state contains QCL information, i.e., one or two source DL RSs, each source RS associated with a QCL type. For example, a TCI state contains a pair of reference signals, each associated with a QCL type, e.g., two different CSI-RSs {CSI-RS1, CSI-R52} configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e., the RX beam to use) from CSI-RS2.

The list of TCI states can be interpreted as a list of possible beams transmitted from the network or a list of possible Transmission/Reception Points (TRPs) used by the network to communicate with the UE.

Control Resource Set (CORESET) and Search Space (SS)

A UE monitors a set of PDCCH candidates in one or more CORESETs on an active DL Bandwidth Part (BWP) on each activated serving cell configured with PDCCH monitoring according to corresponding search space sets, where monitoring implies decoding each PDCCH candidate according to the monitored DCI formats.

A PDCCH candidate can occupy one or more Control-Channel Elements (CCEs), the number of CCEs for a PDCCH candidate is also referred to aggregation levels (AL). AL of 1, 2, 4, 8 and 16 are supported in NR.

A set of PDCCH candidates for a UE to monitor is defined in terms of PDCCH search space sets. A search space set can be a Common Search Space (CSS) set or a UE Specific Search Space (USS) set. A UE can be configured with up to 10 sets of search spaces per BWP for monitoring PDCCH candidates.

A CORESET consists of $N_{RB}^{CORESET}$ RBs in the frequency domain and $N_{symb}^{CORESET} \in \{1,2,3\}$ consecutive OFDM symbols in the time domain. For each DL BWP configured to a UE in a serving cell, a UE can be provided by higher layer signaling with P≤5 CORESETs. For each CORESET, a UE is configured by Radio Resource Control (RRC) signaling with a CORESET Information Element (IE), which includes the following a CORESET index p, 0≤p<16;
a DM-RS scrambling sequence initialization value;
a precoder granularity for a number of Resource Element Groups (REGs) in the frequency domain where the UE can assume use of a same DMRS precoder;
a number of consecutive symbols;
a set of RBs;
CCE-to-REG mapping parameters (interleaved or non-interleaved);
a list of up to 64 TCI-States can be configured in a CORESET p. These TCI states are used to provide QCL relationships between the source DL RS(s) in one RS Set in the TCI State and the PDCCH DMRS ports (i.e., for DMRS ports for PDCCHs received in one of the search spaces defined over CORESET p). The source DL RS(s) can either be a CSI-RS or SSB;
an indication for a presence or absence of a TCI field for DCI format 1_1 transmitted by a PDCCH in CORESET. This is done by the field 'tci-PresentInDCI'.
In the 'tci-PresentInDCI' field is absent in the CORESET IE corresponding to CORESET p, then the UE considers the TCI field to be absent/disabled when scheduling is done via DCI format 1_1. The corresponding field for indicating a presence or absence of a TCI field for DCI format 1_2 is given by 'tci-PresentInDCI-ForDCIFormat1_2'.
For each CORESET, only one TCI state is activated by Medium Access Control (MAC) Control Element (CE) in NR.

An SS set is defined over a CORESET. For each DL BWP configured to a UE in a serving cell, the UE is provided by higher layers with S≤10 SS sets where, for each SS set from the S SS sets, the UE is provided the following by higher layers:

a search space set index $s_f$ 0≤s<40
an association between the search space set s and a CORESET p
a PDCCH monitoring periodicity of $k_s$ slots and a PDCCH monitoring offset of $o_s$ slots
a PDCCH monitoring pattern within a slot, indicating first symbol(s) of the CORESET within a slot for PDCCH monitoring
a duration of $T_s < k_s$ slots indicating a number of slots that the search space set s exists
a number of PDCCH candidates $M_s^{(L)}$ per CCE aggregation level L
an indication that search space set s is either a CSS set or a USS set
DCI formats to monitoring For search space set $s_f$ the UE determines that a PDCCH monitoring occasion(s) exists in a slot with slot number $n_{s,f}^{\mu}$ in a frame with frame number $n_f$ if $(n_f N_s^{frame,\mu} + n_{s,f}^{\mu} - o_s) \bmod k_s = 0$. The UE monitors PDCCH for search space set s for $T_s$ consecutive slots, starting from slot $n_{s,f}^{\mu}$, and does not monitor PDCCH for search space set s for the next $k_s - T_s$ consecutive slots.

FIG. 3 shows an example of PDCCH candidates in an SS set associated with a CORESET with 16 CCEs and with $M^{(1)}=4$, $M^{(2)}=2$, and $M^{(4)}=1$ configured. Note that candidates of different AL are using the same CCEs, in order to minimize the number of CCEs the UE needs to demodulate to receive all the PDCCH candidates with different AL.

Data Transmission Over Multiple TRPs

Single Frequency Network (SFN) Based Multi-TRP Transmission

SFN based transmission over multiple TRPs has been used as a UE transparent way to provide broad coverage, in which the UE does not need to know the presence of multiple TRPs. For example, Multicast Broadcast Single Frequency Network (MBSFN) in LTE is used to transmit a same signal over multiple cells.

Ultra-Reliable Low Latency (URLLC) Transmission with Multiple TRPs

Reliable PDSCH transmission with multiple TRPs has been introduced in NR Rel-16, in which a TB may be transmitted over multiple TRPs to achieve diversity. Reliability is achieved by transmitting different layers of an encoded Codeword (CW) for the TB on the same resource over two TRPs (Scheme 1a), or different part of a CW on different frequency resources over two TRPs (Scheme 2a), or by repeating the same TB over two TRPs in time (Schemes 3 and 4) or frequency domain (Scheme 2b). For this purpose, two TCI states are indicated via the 'Transmission Configuration Indication' field in a DCI scheduling the PDSCH.

In NR Rel-17, it has been proposed to further introduce PDCCH enhancement with multiple TRPs by repeating a PDCCH from different TRPs. Three methods were proposed so far include:

1. CCE/REG bundle interleaving, where a PDCCH in half of the allocated CCEs is sent over one TRP and the other half is sent over a second TRP 2. PDCCH repetition without soft combining, where a PDCCH is repeated over two TRPs, the PDCCH is considered successfully decoded if any one repetition is decoded successfully. No soft combining is performed at the UE.
3. PDCCH repetition with soft combining, similar to 2 above, a PDCCH is repeated over two TRPs, but soft combining is performed before PDCCH decoding.

SUMMARY

Embodiments disclosed herein include Single Frequency Network (SFN) based Physical Downlink Control Channel (PDCCH) diversity over multiple Transmission/Reception Points (TRPs). More specifically, methods performed by a wireless device(s) and a base station(s) are provided. The methods disclosed herein make it possible for the wireless device(s) to receive PDCCH transmission from another one of the multiple TRPs, based on Control-Channel Elements (CCEs) transmitted from all of the multiple TRPs, when one of the multiple TRPs is blocked.

In an embodiment, a method performed by a wireless device is provided. The method includes receiving a configuration for SFN based PDCCH transmission. The method also includes receiving a PDCCH transmission in a Control Resource Set, CORESET, according to two or more Transmit Configuration Indicator, TCI, states configured or activated for the CORESET.

In one embodiment, receiving the configuration comprises receiving a Medium Access Control, MAC, Control Element, CE, command activating the two or more TCI states for the CORESET.

In one embodiment, receiving the configuration comprises receiving an MAC CE command activating a plurality of TCI states for the CORESET and a Downlink Control Information, DCI, message activating the two or more TCI states among the plurality of TCI states.

In one embodiment, receiving the PDCCH transmission comprises receiving the PDCCH transmission concurrently in a same time and frequency resource in the CORESET according to the two or more TCI states activated for the CORESET.

In one embodiment, the time and frequency resource in the CORESET comprises a set of CCEs each comprising a plurality of resource elements or symbols.

In one embodiment, receiving the PDCCH transmission comprises receiving a Demodulation Reference Signal, DMRS, having a DMRS port associated with the PDCCH transmission.

In one embodiment, the method also includes receiving one or more downlink reference signals configured in each of the two or more TCI states activated for the CORESET prior to receiving the PDCCH transmission.

In one embodiment, each of the one or more downlink reference signals is a Quasi Co-Located, QCL, source reference signal for the DMRS with respect to one of QCL types A, B, C, and D.

In one embodiment, one of the one or more downlink reference signals is an QCL source reference signal with respect to QCL type D.

In one embodiment, each of the one or more downlink RSs is one of a Tracking Reference Signal, TRS, a Synchronization Signal Block, SSB, and a Channel State Information-Reference Signal, CSI-RS.

In one embodiment, the method also includes performing one or more actions according to the two or more TCI states prior to PDCCH decoding.

In one embodiment, performing one or more actions comprises performing synchronization and estimation of channel properties associated with each of the two or more TCI states based on one or more downlink reference signals configured in a respective one of the two or more TCI states.

In one embodiment, the channel properties comprise one or more of average delay, delay spread, Doppler shift, Doppler spread, and spatial receive filter.

In one embodiment, performing one or more actions comprises one or more of: receiving the PDCCH transmission with two or more receive beams each associated with a respective one of the two or more TCI states, performing channel estimation based on a Demodulation Reference Signal, DMRS, associated with the PDCCH transmission in the CORESET by assuming that a DMRS port is QCL with the one or more downlink reference signals configured in each of the two or more TCI states activated for the CORESET, and combining the PDCCH transmission received with the two or more receive beams.

In one embodiment, wherein receiving the configuration comprises receiving an explicit configuration via Radio Resource Control, RRC, signaling.

In one embodiment, receiving the configuration comprises receiving an implicit configuration in response to the CORESET being activated with the two or more TCI states.

In one embodiment, each of the two or more TCI states is associated with a Transmission/Reception Point, TRP.

In an embodiment, a wireless device is provided. The wireless device includes processing circuitry configured to cause the wireless device to receive a configuration for SFN based PDCCH transmission and receive a PDCCH transmission in a CORESET according to two or more TCI states configured or activated for the CORESET.

In one embodiment, the processing circuitry is further configured to cause the wireless device to perform any of the steps in any of the claims performed by the wireless device.

In an embodiment, a method performed by a base station is provided. The method includes transmitting a configuration for SFN based PDCCH transmission. The method also includes transmitting a PDCCH transmission in a CORESET according to two or more TCI states configured or activated for the CORESET.

In one embodiment, transmitting the configuration comprises transmitting a MAC CE command activating the two or more TCI states for the CORESET.

In one embodiment, transmitting the configuration comprises transmitting a MAC CE command activating a plurality of TCI states for the CORESET and a DCI message activating the two or more TCI states among the plurality of TCI states.

In one embodiment, transmitting the PDCCH transmission comprises transmitting the PDCCH transmission concurrently in a same time and frequency resource in the CORESET according to the two or more TCI states activated for the CORESET.

In one embodiment, the time and frequency resource in the CORESET comprises a set of CCEs each comprising a plurality of resource elements or symbols.

In one embodiment, transmitting the PDCCH transmission comprises transmitting a DMRS having a DMRS port associated with the PDCCH transmission.

In one embodiment, the method also includes transmitting one or more downlink reference signals configured in each of the two or more TCI states activated for the CORESET prior to transmitting the PDCCH transmission.

In one embodiment, each of the one or more downlink reference signals is a QCL source reference signal with respect to one of QCL types A, B, C, and D.

In one embodiment, one of the one or more downlink reference signals is an QCL source reference signal for the DMRS with respect to QCL type D.

In one embodiment, each of the one or more downlink RSs is one of a TRS, an SSB, and a CSI-RS.

In one embodiment, transmitting the configuration comprises transmitting an explicit configuration via RRC signaling.

In one embodiment, transmitting the configuration comprises transmitting an implicit configuration in response to the CORESET being activated with the two or more TCI states.

In one embodiment, each of the two or more TCI states is associated with a Transmission/Reception Point, TRP.

In an embodiment, a base station is provided. The base station includes processing circuitry configured to cause the base station to transmit a configuration for SFN based PDCCH transmission and transmit a PDCCH transmission in a CORESET according to two or more TCI states configured or activated for the CORESET.

In one embodiment, the processing circuitry is further configured to cause the base station to perform any of the steps in any of the claims performed by the base station.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
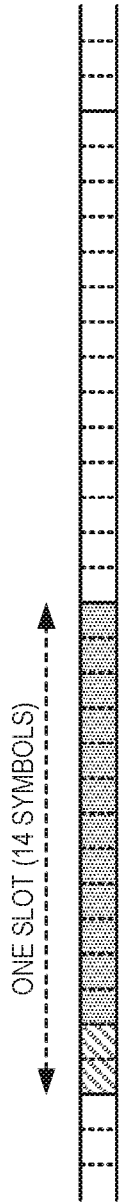
FIG. 1 is a schematic diagram providing an exemplary illustration of data scheduling in New Radio (NR) based on a 14-symbol slot.
Figure 2:
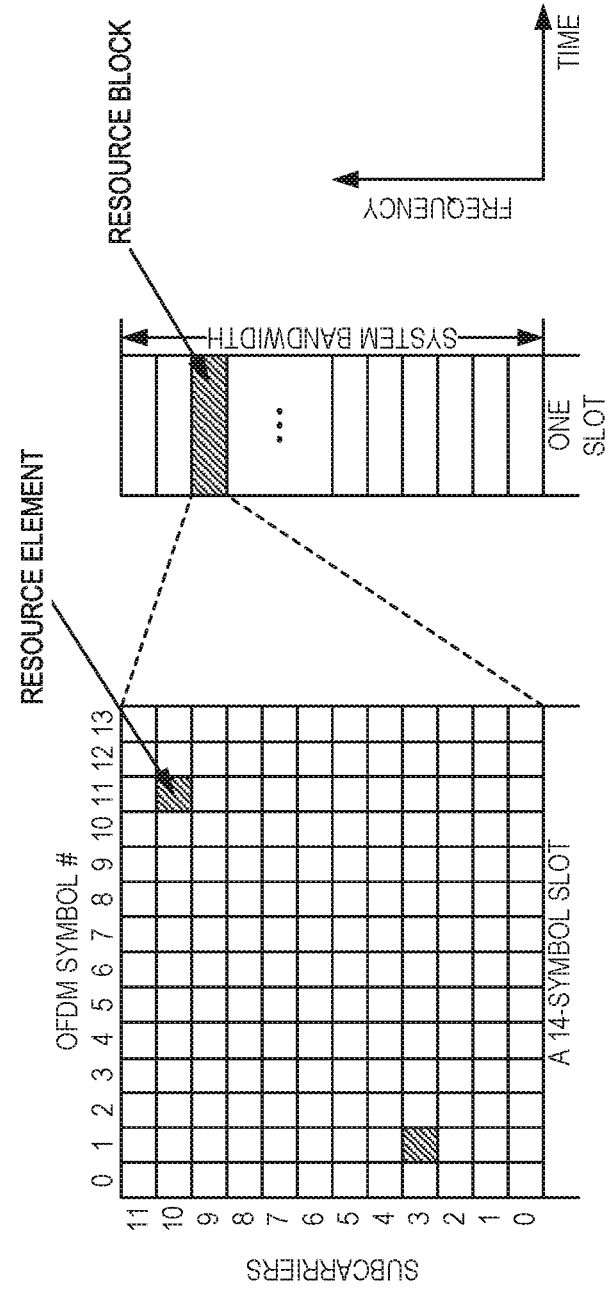
FIG. 2 is a schematic diagram providing an exemplary illustration of a basic NR physical time-frequency resource grid.
Figure 3:
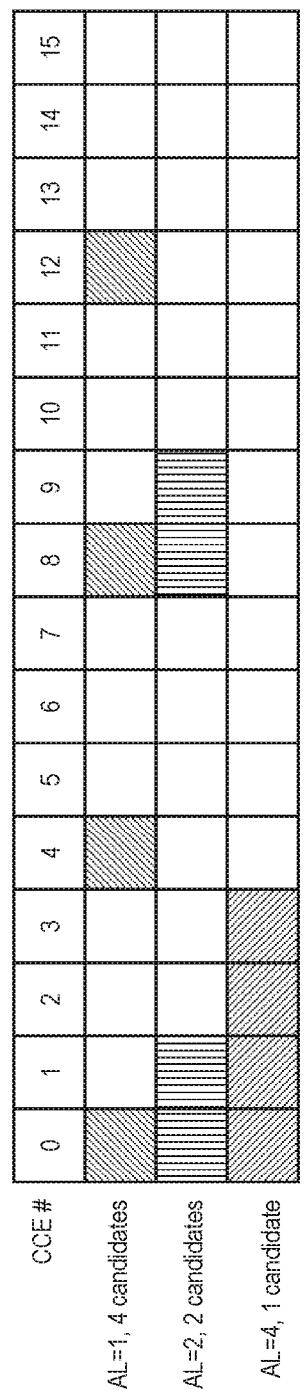
FIG. 3 shows an example of Physical Downlink Control Channel (PDCCH) candidates in a Search Space (SS) set associated with a Control Resource Sets (CORESET)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation or a Transmit Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Evaluations have shown that all three multi-TRP schemes provide better Block Error Rate (BLER) performance for the Physical Downlink Control Channel (PDCCH) reception than single TRP scheme in absence of channel blocking.

A problem occurs in case the channel from one TRP is blocked, i.e., the channel between TRP and UE is obstructed. Notably, blocking is highly possible in Frequency Range (FR2), where beams are narrow, and propagation requires a Line-of-Sight condition. In this case, the performance of Control-Channel Elements (CCE) interleaving approach, where half of CCEs is transmitted from one TRP and the other half is transmitted from another TRP, can be poor due to signal loss in half of the CCEs. Hence, this method has a problem, particularly for FR2.

Alternatively, PDCCH repetition can be used where the same Downlink Control Information (DCI) is transmitted in more than one PDCCH, from a different TRP. PDCCH repetition is more robust against blocking, but for a same total number of CCEs, each PDCCH repetition has only half of the CCEs and, thus, a higher code rate that degrades performance. This is a problem.

Certain aspects of the present disclosure and their embodiments may provide solutions to the aforementioned or other challenges. Embodiments of the solutions proposed herein use PDCCH repetition but with overlapping (same) CCEs for two or more PDCCHs. A single Demodulation Reference Signal (DMRS) is used, which is transmitted from two (or more) TRPs. The DMRS can be associated with two (or more) TCI states. This is sometimes called Single Frequency Network (SFN) transmission although modified in this case as the UE may be "aware" of that two (or more) TCI states is associated with the single DMRS (port). Some example embodiments are as follows:

1. A method of transmitting a PDCCH over two or more TRPs and/or two or more beams from a same TRP, in a CORESET in a wireless network comprising at least a wireless node and at least a UE. The method comprising:
   a. Activating, by the wireless node, two or more TCI states, each associated with one TRP, for the CORESET;
   b. Transmitting to the UE the PDCCH over the two or more TRPs in a same time and frequency resource; and
   c. Receiving by the UE the PDCCH according to the two or more activated TCI states.
2. The method of 1, wherein the CORESET further comprises a number of Physical Resource Blocks, PRBs, and a number of Orthogonal Frequency Division Multiplexing (OFDM) symbols.
3. The method of 1, wherein the CORESET further comprises a number of CCEs each comprising a number of Resource Group (REG) bundles.
4. The method of 1, wherein the PDCCH may be precoded differently over different TRPs with a precoding granularity in REG bundle, i.e., a same precoder is applied within each REG bundle.
5. The method of 1, wherein the PDCCH may be applied with a different phase factor over different TRPs in each REG bundle.

There are, proposed herein, various embodiments which address one or more of the issues disclosed herein.

In one aspect, a method performed by a wireless device for enabling SFN based PDCCH diversity is provided. The method includes receiving a PDCCH transmission in a same time and frequency resource (e.g., CCE) in a CORESET according to two or more TCI states activated for the CORESET.

In another aspect, a method performed by a base station for enabling SFN based PDCCH diversity is provided. The method includes activating a first number ($\geq 2$) of TCI states for a CORESET. The method also includes transmitting a PDCCH according to a second number ($\geq 2$) of TCI states activated for the CORESET in a same time and frequency resource (e.g., CCE), wherein the second number of TCI states is less than or equal to the first number of TCI states.

Certain embodiments may provide one or more of the following technical advantage(s). With SFN type of PDCCH transmission disclosed herein, when one TRP is blocked, the PDCCH transmission can still be received from the other TRP and the number of CCEs is unchanged. That is, all CCEs are transmitted from all participating TRPs, compared to the known method wherein the PDCCH transmission was over only half of the CCEs (as in case of CCE interleaving or PDCCH repetition).

This SFN type of PDCCH transmission can perform better than the CCE interleaving and PDCCH repetition in case of blocking. In addition, it requires less changes in the 3GPP standard.

Figure 4:
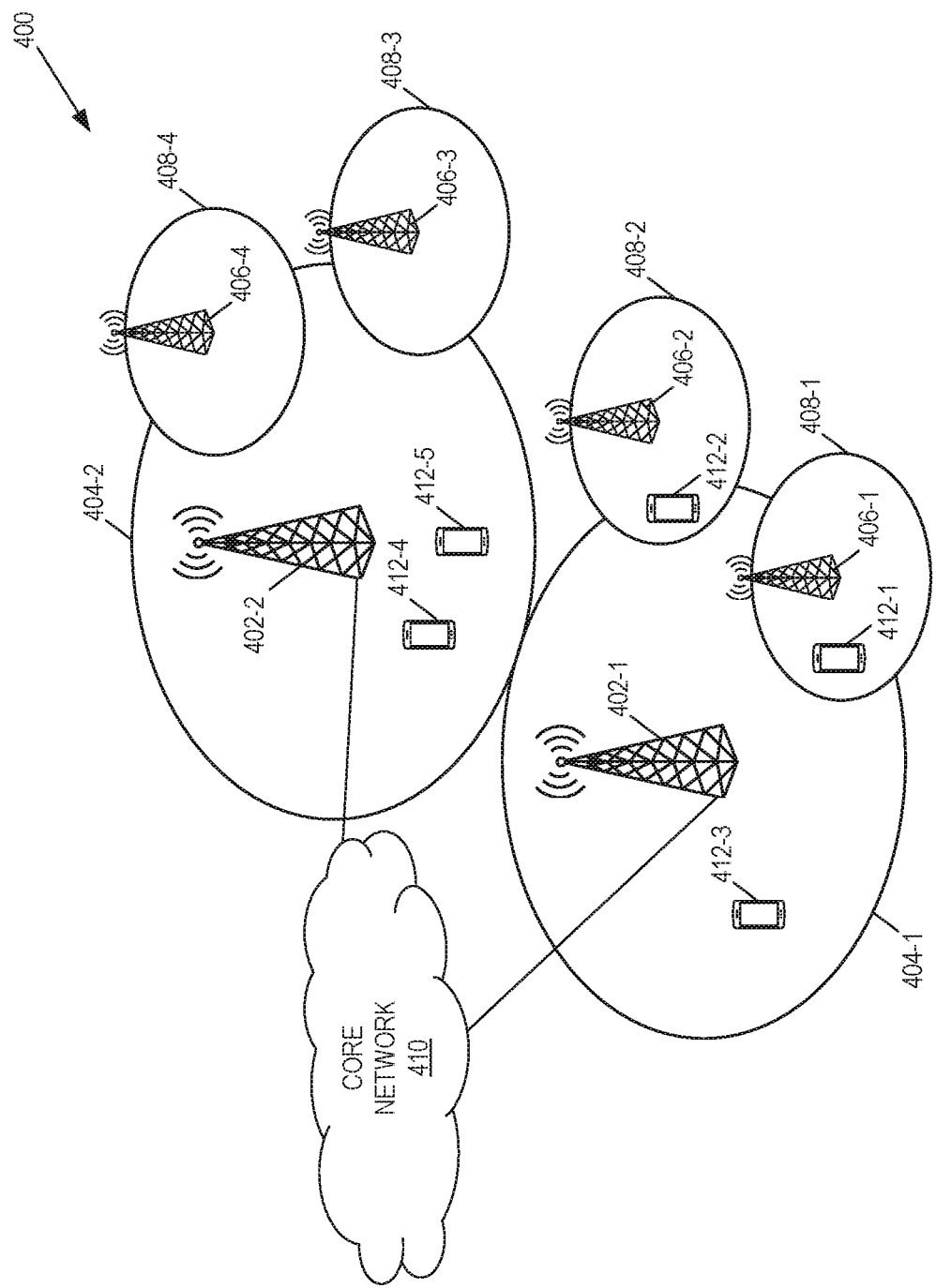
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC). In this example, the RAN includes base stations 402-1 and 402-2, which in the 5GS include NR base stations (gNBs) and optionally next generation eNBs (ng-eNBs) (e.g., LTE RAN nodes connected to the 5GC), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

Figure 5:
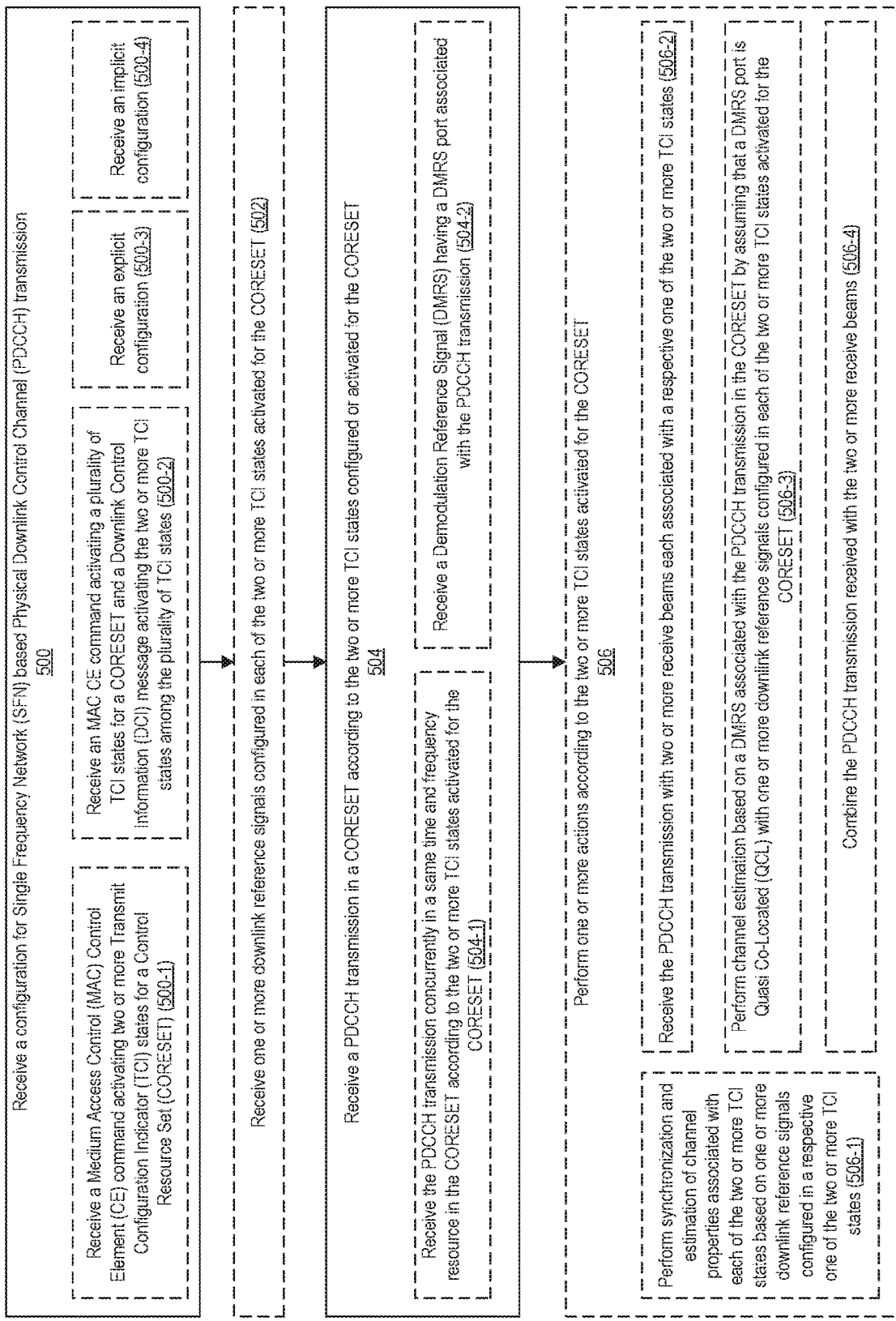
FIG. 5 is a flowchart of a method performed by a wireless device according to embodiments of the present disclosure.
Figure 6:
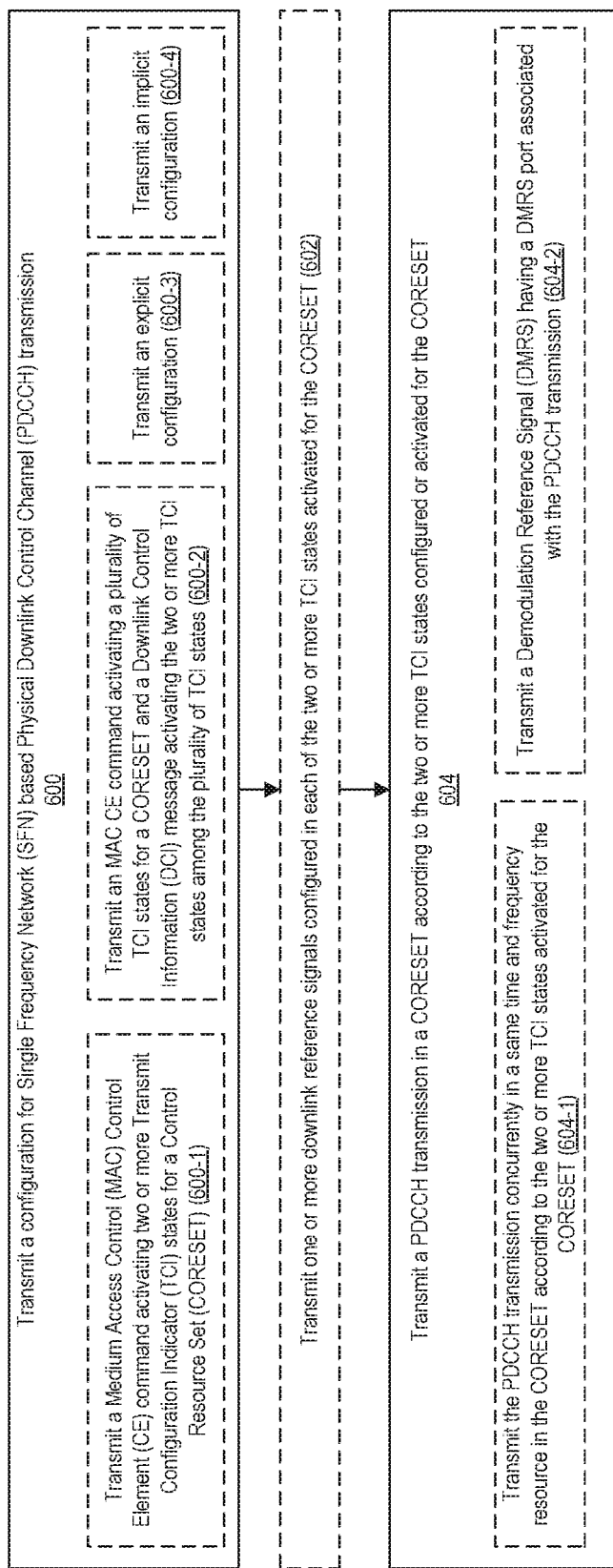
FIG. 6 is a flowchart of a method performed by a base station according to embodiments of the present disclosure.

Before discussing specific embodiments of the present disclosure, methods performed by a wireless device(s) and a base station(s) according to embodiments of the present disclosure are first provided with reference to FIGS. 5 and 6.

FIG. 5 is a flowchart of an exemplary method performed by a wireless device according to embodiments of the present disclosure. The wireless device is configured to receive a configuration for SFN based PDCCH transmission (step 500). In one embodiment, the wireless device receives an MAC CE command activating two or more TCI states for a CORESET (step 500-1). In one embodiment, the wireless device receives an MAC CE command activating a plurality of TCI states for a CORESET and a DCI message activating two or more TCI states among the plurality of TCI states (step 500-2). In one embodiment, the wireless device receives an explicit configuration (step 500-3) or an implicit configuration (step 500-4).

The wireless device may receive one or more downlink reference signals configured in each of the two or more TCI states activated for the CORESET (step 502).

The wireless device receives a PDCCH transmission according to the two or more TCI states activated for the CORESET (step 504). In one embodiment, the wireless device may receive the PDCCH transmission concurrently in a same time and frequency resource in the CORESET according to the two or more TCI states activated for the CORESET (step 504-1). In one embodiment, the wireless device may receive a DMRS having a DMRS port associated with the PDCCH transmission (step 504-2).

The wireless device may perform one or more actions according to the two or more TCI states activated for the CORESET (step 506). In one embodiment, the wireless device may perform synchronization and estimation of channel properties associated with each of the two or more TCI states based on one or more downlink reference signals configured in a respective one of the two or more TCI states (step 506-1). In one embodiment, the wireless device may receive the PDCCH transmission with two or more receive beams each associated with a respective one of the two or more TCI states (step 506-2). The wireless device may also perform channel estimation based on a DMRS associated with the PDCCH transmission in the CORESET by assuming that a DMRS port is QCL with one or more downlink reference signals configured in each of the two or more TCI states activated for the CORESET (step 506-3). The wireless device may also combine the PDCCH transmission received with the two or more receive beams (step 506-4).

FIG. 6 is a flowchart of an exemplary method performed by a base station according to embodiments of the present disclosure. The base station is configured to transmit a configuration for SFN based PDCCH transmission (step 600). In one embodiment, the base station transmits an MAC CE command activating two or more TCI states for a CORESET (step 600-1). In one embodiment, the base station transmits an MAC CE command activating a plurality of TCI states for a CORESET and a DCI message activating two or more TCI states among the plurality of TCI states (step 600-2). In one embodiment, the base station transmits an explicit configuration (step 600-3) or an implicit configuration (step 600-4).

The base station may transmit one or more downlink reference signals configured in each of the two or more TCI states activated for the CORESET (step 602).

The base station transmits a PDCCH transmission according to the two or more TCI states activated for the CORESET (step 604). In one embodiment, the base station may transmit the PDCCH transmission concurrently in a same time and frequency resource in the CORESET according to the two or more TCI states activated for the CORESET (step 604-1). In one embodiment, the base station may transmit a DMRS having a DMRS port associated with the PDCCH transmission (step 604-2).

Figure 7:
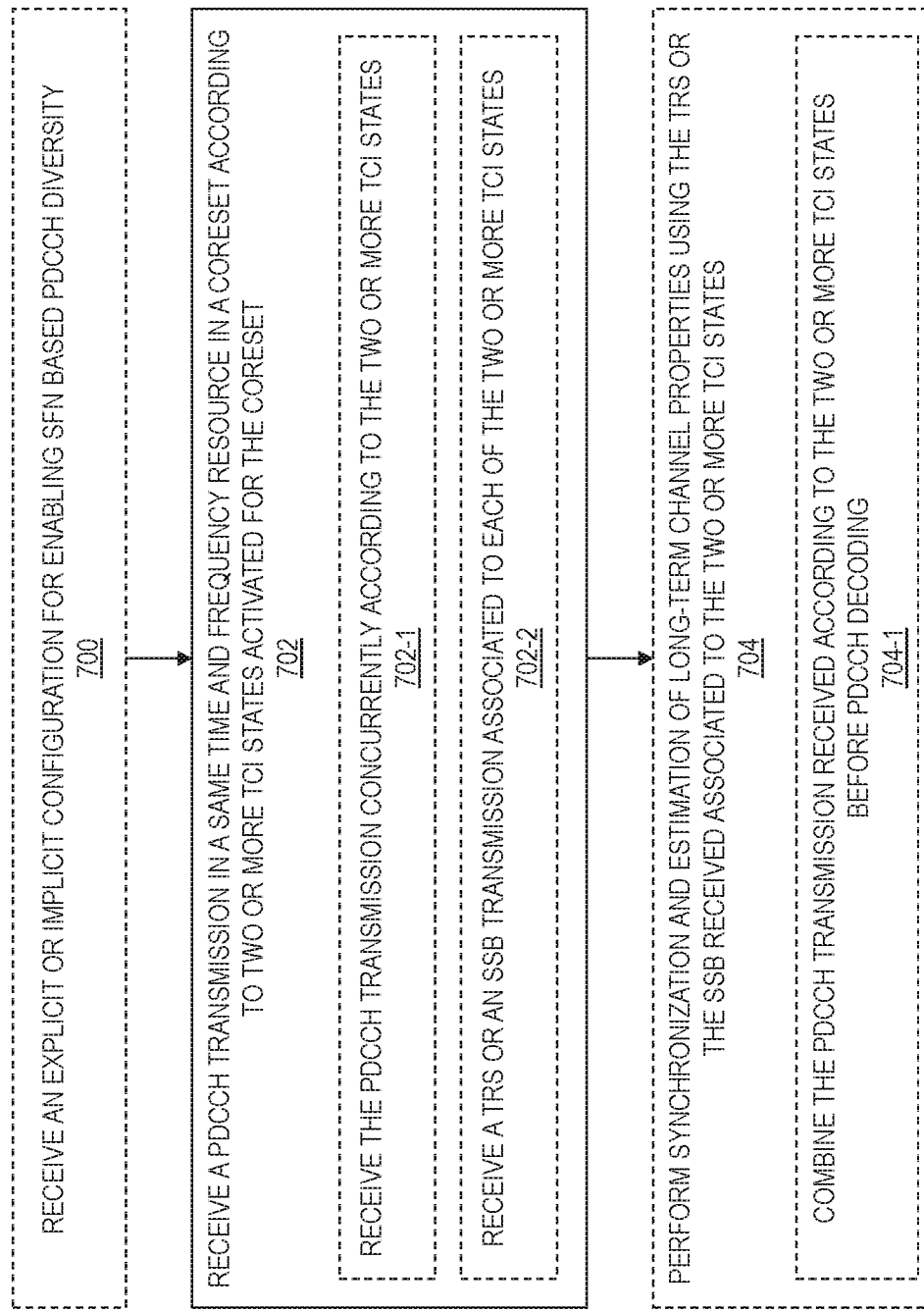
FIG. 7 is a flowchart of an exemplary method performed by a wireless device for enabling Single Frequency Network (SFN) based PDCCH diversity.

FIG. 7 is a flowchart of an exemplary method performed by a wireless device for enabling SFN based PDCCH diversity. The wireless device may receive an explicit or implicit configuration for enabling SFN based PDCCH diversity (step 700). The wireless device receives a PDCCH transmission in a same time and frequency resource in a CORESET according to two or more TCI states activated for the CORESET (step 702). The wireless device may perform synchronization and estimation of long-term channel properties using TRS or SSB received according to the two or more TCI states (step 704).

Figure 8:
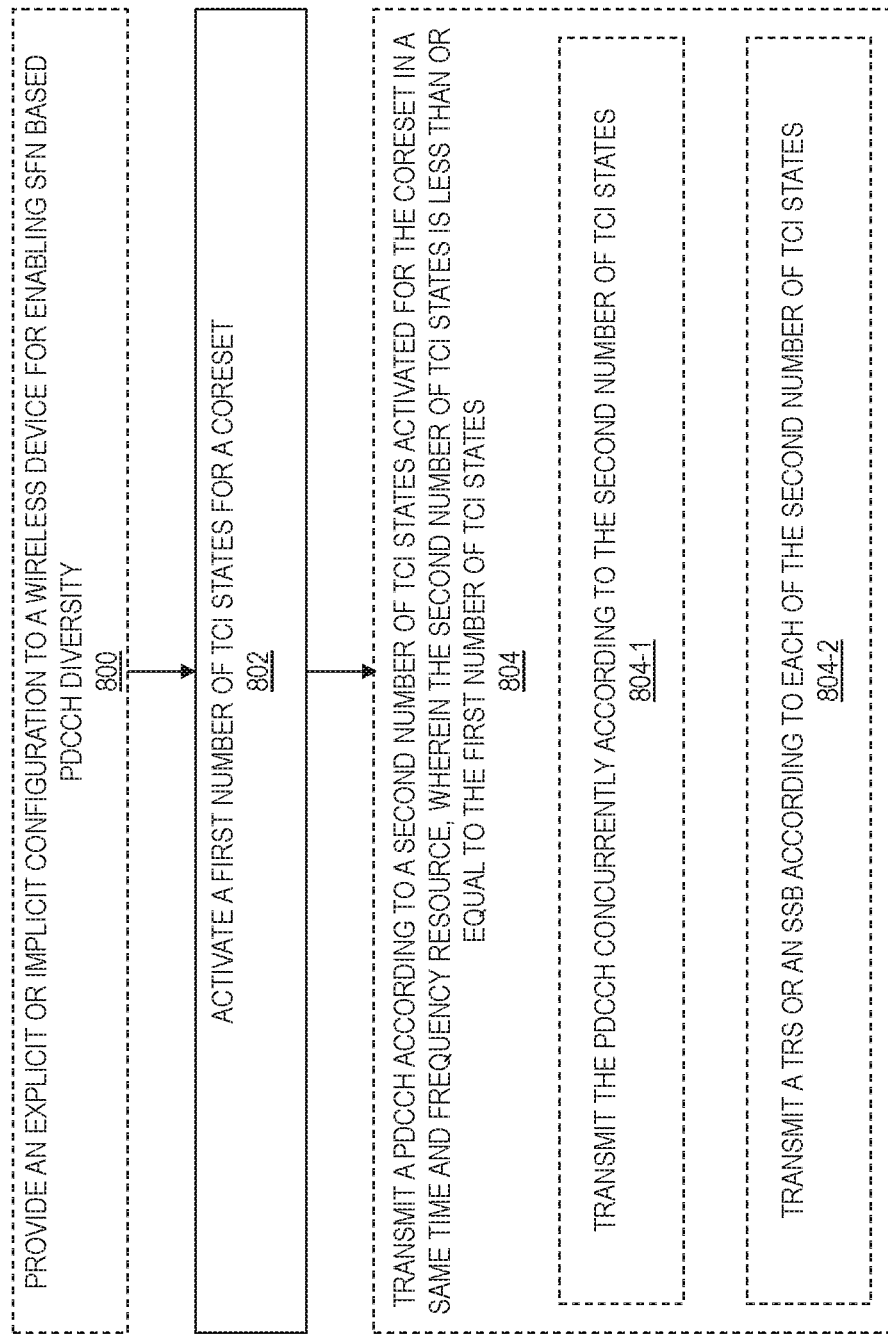
FIG. 8 is a flowchart of an exemplary performed by a base station for enabling SFN based PDCCH diversity.

FIG. 8 is a flowchart of an exemplary performed by a base station for enabling SFN based PDCCH diversity. The base station may provide an explicit or implicit configuration to a wireless device for enabling SFN based PDCCH diversity (step 800). The base station actives a first number (≥2) of TCI states for a CORESET (step 802). The base station transmits a PDCCH according to a second number (≥2) of TCI states activated for the CORESET in a same time and frequency resource, wherein the second number of TCI states is less than or equal to the first number of TCI states (step 804).

Specific embodiments of the present disclosure are now discussed.

Embodiment 1 (e.g., Step 500-1, 600-1)

SFN Based PDCCH Transmission Using Activated Number of TCI States Per CORESET

In this embodiment, when a CORESET (i.e., ControlResourceSet as defined in 3GPP TS 38.331) is activated with two or more TCI states by a Medium Access Control (MAC) Control Element (CE) command, a PDCCH is repeated over two or more TRPs, each TRP is associated with a respective one of the activated TCI states, in the same CCEs of the CORESET.

In this embodiment (e.g., 504-2, 604-2), the number of activated TCI states per CORESET is the same as the number of TCI states over which PDCCH is repeated in the same CCEs of the CORESET. The meaning of "associated" is that the UE assumes that a DMRS antenna port for PDCCH receptions in the CORESET is Quasi Co-Located with the one or more DL RS configured by each of the two or more TCI states (e.g., steps 502, 602, 506-3). Hence, a DMRS is Quasi Co-Located (QCL) with more than a single DL RS (for a given QCL Type).

Figure 9:
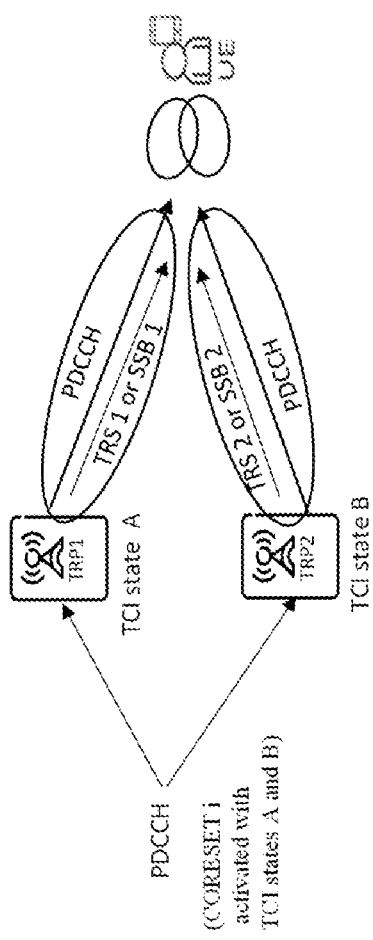
FIG. 9 is a schematic diagram providing an exemplary illustration of a PDCCH transmitted over two Transmission/Reception Points (TRPs) to a User Equipment (UE) in a same set of Control Channel Elements (CCEs) in a CORESET.

An example is shown in FIG. 9, where a PDCCH is transmitted over two TRPs to a UE in the same set of CCEs in CORESET i.e., Tracking Reference Signal (TRS) #1 and/or Synchronization Signal Block (SSB) #1 are also transmitted from TRP 1 and act as the QCL source DL RS for TCI state A. Similarly, TRS #2 and/or SSB #2 are also transmitted from TRP 2 and act as the QCL source DL RS for TCI state B. TCI states A and B are two activated TCI states for CORESET i.

In some embodiments, the one or more TCI states activated by a MAC CE command per CORESET all have a qcl_type set to value 'typeD' as defined in 3GPP TS 38.331.

In case that multiple antenna elements are deployed in a TRP, beamforming or equivalently, MIMO precoding across antennas, can be used to extend coverage of the PDCCH. In this case, the PDCCH may be pre-coded over the antenna elements differently in different TRPs with a precoding granularity of REG bundle, i.e., a same precoder is applied to all resource elements within each REG bundle in a CCE. Precoding here means applying an amplitude and phase scaling factor to the PDCCH in each antenna. The size of a REG bundle can be 2,3, and 6 REGs, and is configured by higher layers.

Different phases may also be applied to the REG bundles in different TRPs to prevent complete signal cancellation at the UE.

When the UE is receiving a PDCCH DMRS with a CORESET configured with two TCI states according to this embodiment, the UE may perform synchronization and estimation of long-term channel properties using the DL RS (e.g., TRS) in both TCI states in parallel (e.g., 506-1). For example, the UE obtains two channel delay spreads (to be compared to legacy operation where a single channel delay spread is obtained). The UE may then combine these measurements to obtain the channel properties of the SFN channel. For example, the UE can compute a weighted average of the delay spread. This average is then used as input to the channel estimation algorithm for the PDCCH DM-RS. Note that the PDCCH and PDCCH DMRS are transmitted as SFN while the TRSs are not transmitted as SFN, but transmitted "per TRP". So, the measurements on the TRS give the UE some information on whether one TRP is dominating over the other, e.g., whether the UE is closer to one of the TRPs or whether the channel towards one of the TRPs is blocked. An algorithm in the UE can then decide to only use estimates from one of the TRSs (one TCI states) as the SFN transmission is weak (meaning that even if PDCCH is SFN transmitted, one TRP is dominating).

When a UE is configured with a CORESET with two activated TCI states, it needs to be able to receive a PDCCH from two TRPs simultaneously. In FR1, UE antennas are typically omni-directional and thus are able to receive signals from all TRPs simultaneously. In FR2, this typically means that the UE needs to have two receive panels, each receiving from one TRP.

TRS from each TRP can be used by the UE to estimate time, frequency, and other channel properties such as delay spread and/or Doppler spread associated with the TRP, while SSB can be used by the UE to determine direction information of each TRP and the best receive beam or panel for each TRP.

In case of FR2 and the UE with two receive panels, the UE may perform channel estimation per receive panel and combine the received PDCCH signal based on maximum ratio combing (MRC) or Minimum Mean Square Error (MMSE) before PDCCH decoding (e.g., 506-4).

When a CORESET is activated with two or more TCI states, a UE may be configured explicitly by RRC (e.g., steps 500-3, 600-3) to use the SFN based PDCCH transmission. Alternatively, the SFN based PDCCH transmission is used in a CORESET when the CORESET is activated with two or more TCI states (e.g., steps 500-4, 600-4).

Embodiment 2

SFN Based PDCCH Transmission Using a Subset of Activated Number of TCI States Per CORESET In this embodiment (e.g., steps 500-2, 600-2), a CORESET is activated with P TCI states by a MAC CE command. Then, a subset Q of the P TCI states (where Q<P) are selected per CORESET via a DCI. Here, the DCI, which selects the subset of Q TCI states, includes a TCI field and a codepoint in the DCI field of DCI that may be mapped to up to Q TCI states.

In one example, P=8 and Q=2. Then, a CORESET can be activated with P=8 TCI states and a codepoint in the TCI field of DCI that may be mapped to either 1 TCI state or 2 TCI states. When the UE is indicated for a CORESET with a codepoint in the TCI field of DCI that is mapped to 2 TCI states, then the 2 TCI states indicated for the CORESET are selected.

In the next step of this embodiment (e.g., 504-2, 604-2), a PDCCH is repeated (i.e., in a SFN manner) over P TRPs where each TRP is associated with a respective one of the P selected TCI states, and the PDCCH repetitions are in the same CCEs of the CORESET. Note that this embodiment differs from embodiment 1 in the sense that the number activated TCI states P per CORESET is larger than the number of TCI states Q over which PDCCH is repeated in the same CCEs of the CORESET. The UE assumes that a DMRS antenna port for PDCCH receptions in the CORESET is QCL with the Q source DL RSs provided by the selected P TCI states.

Figure 10:
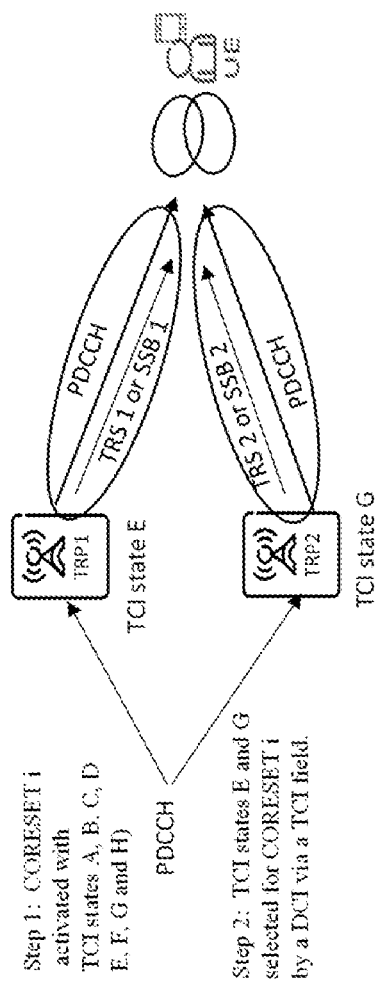
FIG. 10 is a schematic diagram providing another exemplary illustration of a PDCCH transmitted over two TRPs to a UE in the same set of CCEs in CORESET.

An example is shown in FIG. 10, where a PDCCH is transmitted over two TRPs to a UE in the same set of CCEs in CORESET i. Here, TCI states A-G are activated for CORESET i, and TCI states E and G are selected via a DCI. TRS #1 and/or SSB #1 are also transmitted from TRP 1 and act as the QCL source DL RSs for TCI state E. Similarly, TRS #2 and/or SSB #2 are also transmitted from TRP 2 and act as the QCL source DL RS for TCI state G. TCI states E and G are two selected TCI states for CORESET i.

Note that activating a TCI state for a CORESET via MAC CE in general can involve significant delay. As per 3GPP TS 38.133 V15.10.0 (see clause 8.10.3), the UE is allowed to re-acquire the QCL properties of an SSB (i.e., the SSB that serves as the QCL source RS in the TCI state to be activated via MAC CE) after the MAC CE activates a TCI state for the CORESET. This can cause a notable delay in when the activated TCI state for the CORESET can be applied by the UE. This embodiment alleviates this issue as a large number P>1 of TCI states is activated via MAC CE, and once the P TCI states are activated, a subset Q<P of TCI states can be dynamically selected by a DCI for future PDCCHs. Given selecting Q out of P TCI states via DCI is a low delay operation, this embodiment is useful as it significantly reduces the activation delay.

Figure 11:
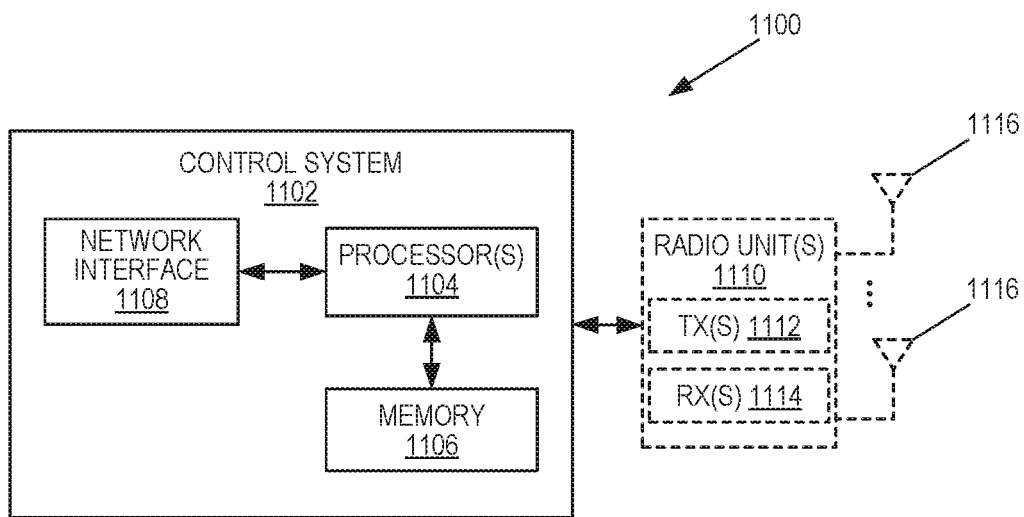
FIG. 11 is a schematic block diagram of a radio access node according to some embodiments of the present disclosure.

FIG. 11 is a schematic block diagram of a radio access node 1100 according to some embodiments of the present disclosure. Optional features are represented by dashed boxes. The radio access node 1100 may be, for example, a base station 402 or 406 or a network node that implements all or part of the functionality of the base station 402 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
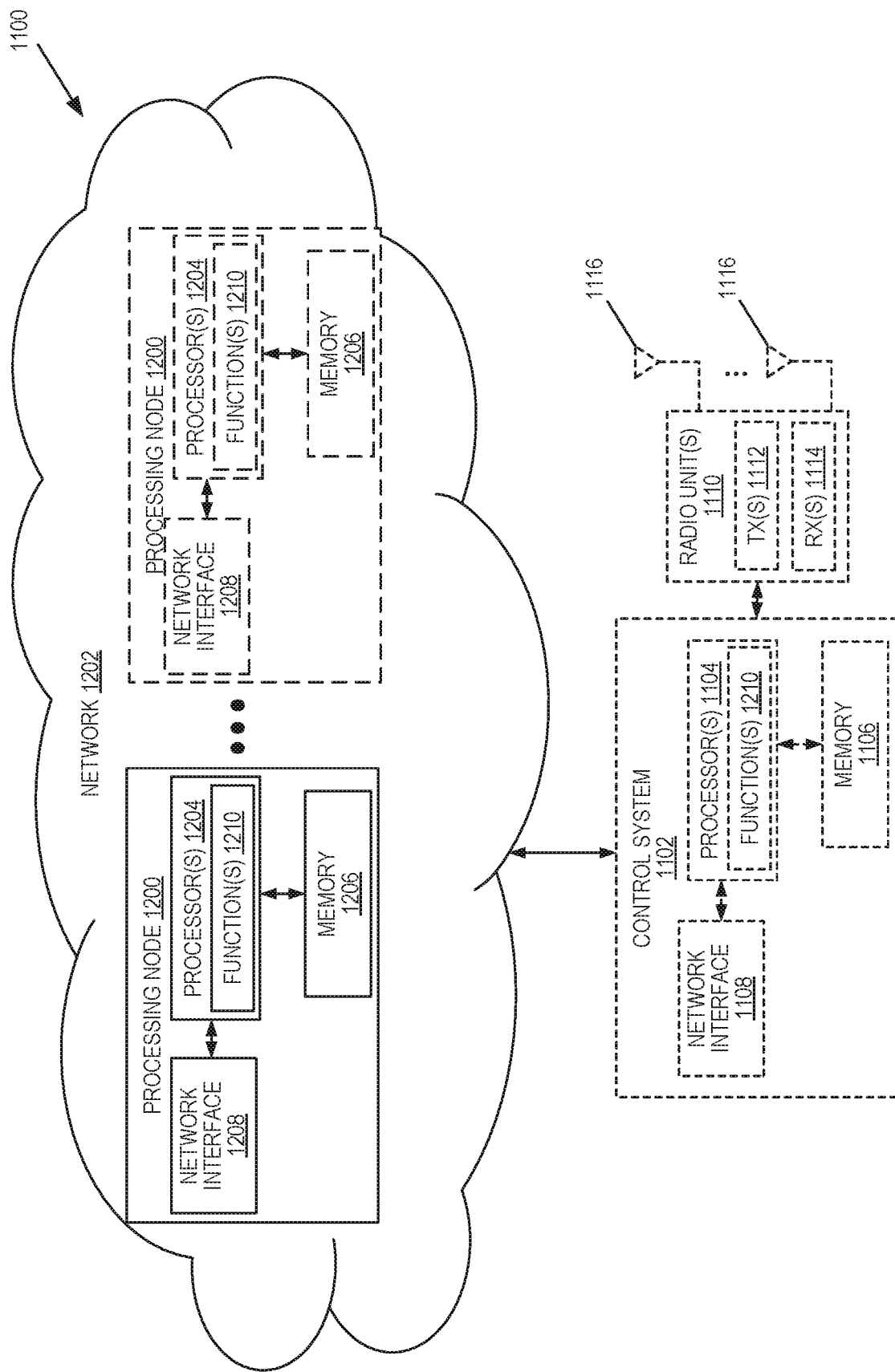
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
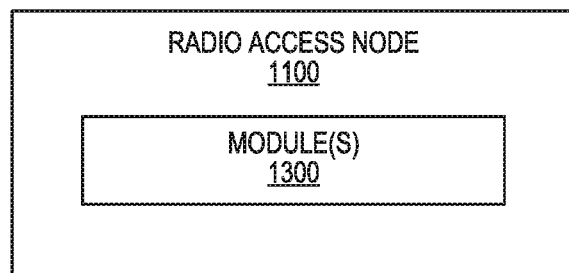
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
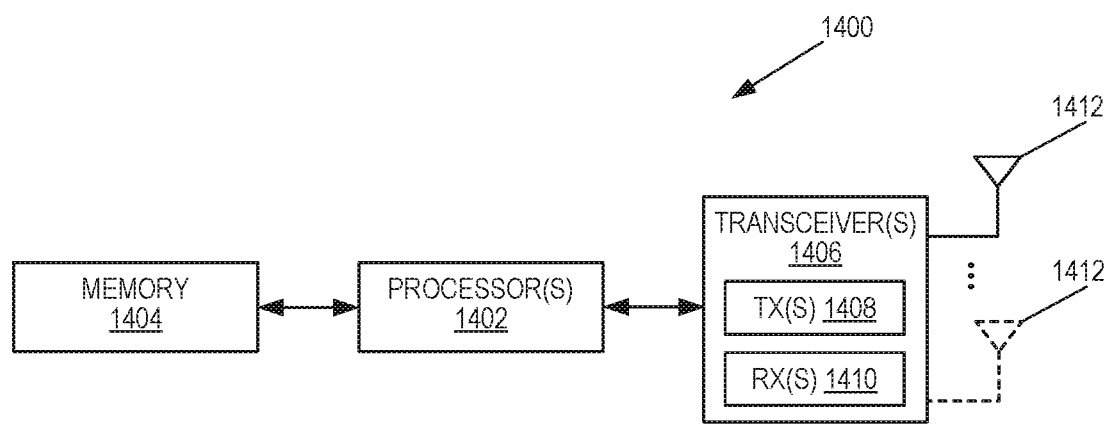
FIG. 14 is a schematic block diagram of a wireless communication device according to some embodiments of the present disclosure.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
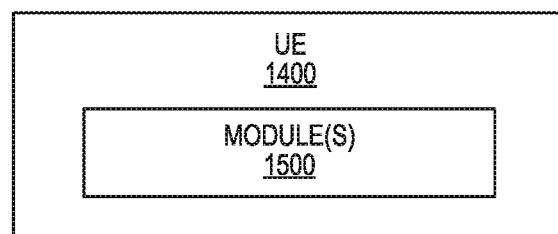
FIG. 15 is a schematic block diagram of the wireless communication device according to some other embodiments of the present disclosure.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein.

Figure 16:
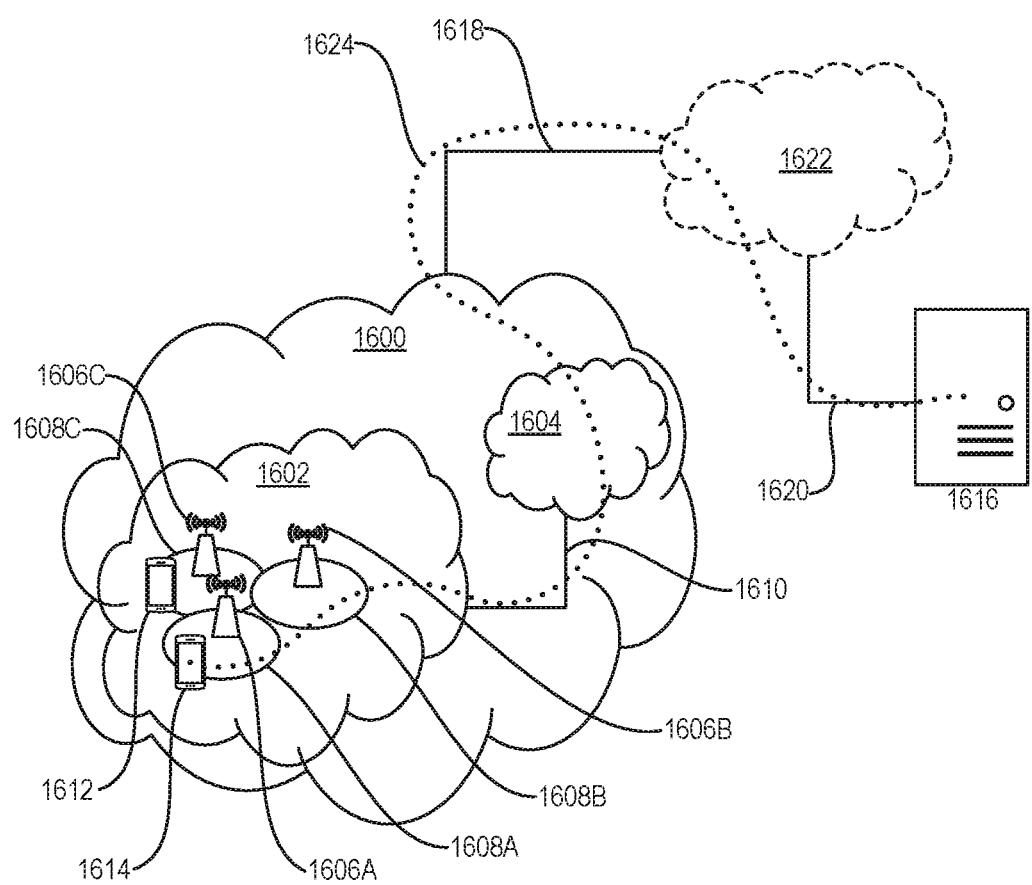
FIG. 16 is a schematic diagram of a communication system in accordance with an embodiment of the present disclosure.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
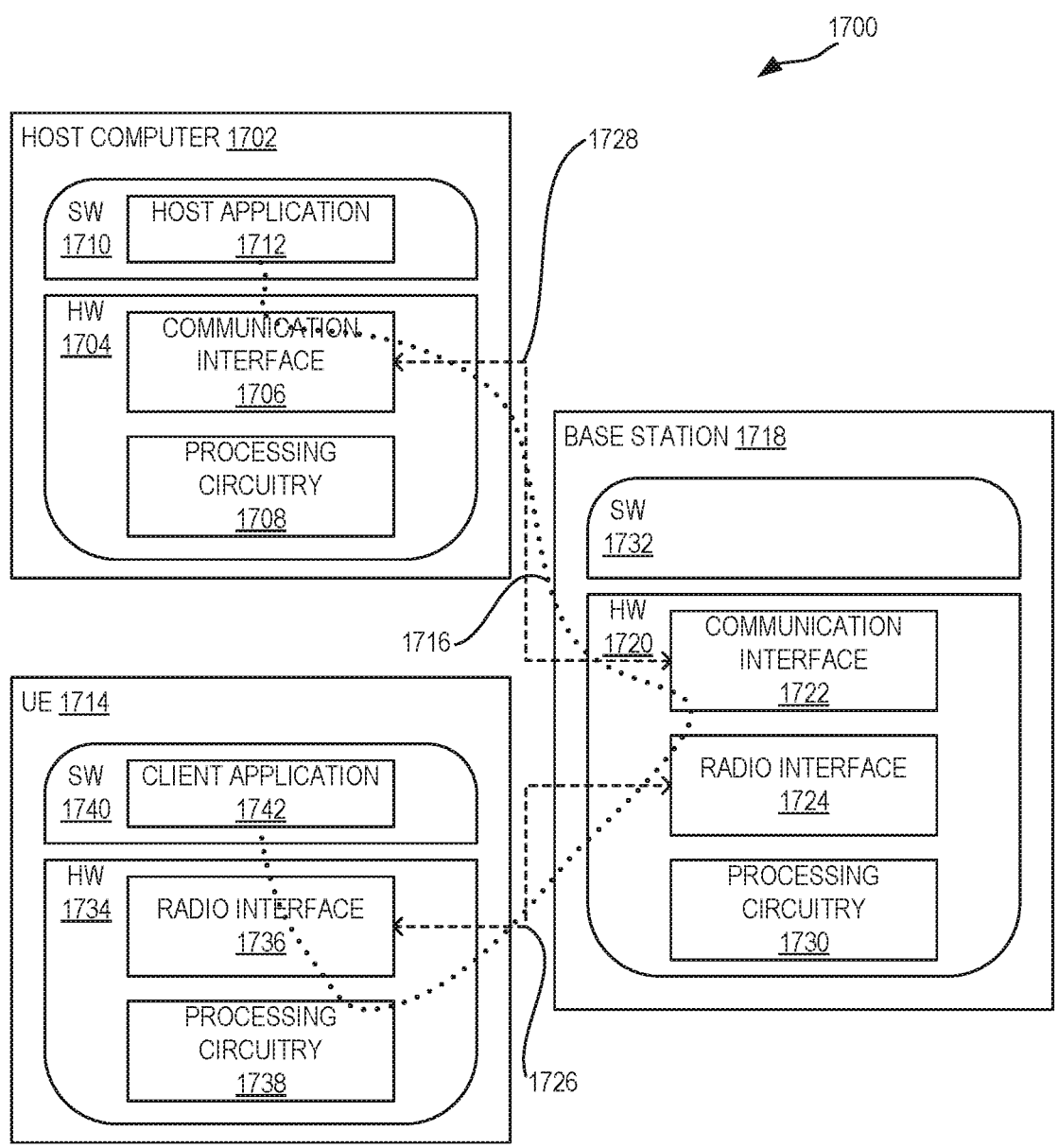
FIG. 17 is a schematic diagram of the UE, base station, and host computer in accordance with an embodiment of the present disclosure.

It is noted that the host computer 1702, the base station 1718, and the UE 1714 illustrated in FIG. 17 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 17 and independently, the surrounding network topology may be that of FIG. 14.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

Figures 18, 19:
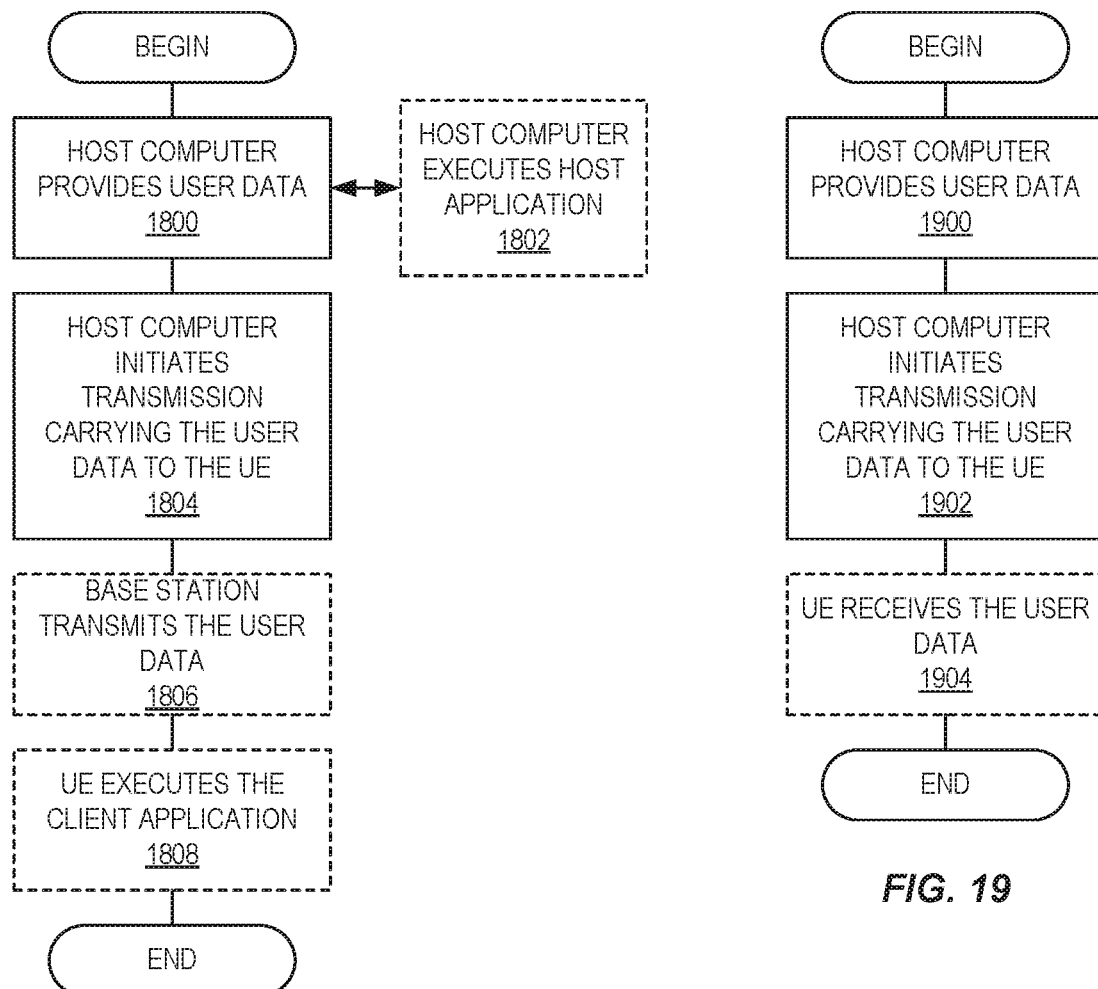
FIG. 18 is a flowchart illustrating a method implemented in a communication system in accordance with one embodiment of the present disclosure.
FIG. 19 is a flowchart illustrating a method implemented in a communication system in accordance with one embodiment of the present disclosure.

FIG. 18 is a flowchart illustrating a method implemented in a communication system, in accordance with one embodiment. The communication system includes a host computer, a base station, and a UE which may be those described with reference to FIGS. 14 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 14 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a wireless device for enabling Single Frequency Network, SFN, based Physical Downlink Control Channel, PDCCH, diversity. The method includes receiving (702) a PDCCH transmission in a same time and frequency resource (e.g., Control Channel Element, CCE) in a Control Resource Set, CORESET, according to two or more Transmit Configuration Indicator, TCI, states activated for the CORESET (e.g., steps 504-1, 604-1).

Embodiment 2: receiving (702) the PDCCH transmission comprises receiving (702-1) the PDCCH transmission concurrently according to the two or more TCI states.

Embodiment 3: receiving (702) the PDCCH transmission comprising receiving (702-2) a Tracking Reference Signal, TRS, or a Synchronization Signal Block, SSB, transmission associated to each of the two or more TCI states.

Embodiment 4: each of the TRS or SSB is a Quasi-Co-Located, QCL, source Reference Signal, RS, for one of the two or more TCI states.

Embodiment 5: each of the two or more TCI states has a qci_type set to value Type D.

Embodiment 6: the method also includes performing (704) synchronization and estimation of long-term channel properties using the TRS or the SSB received associated to the two or more TCI states concurrently.

Embodiment 7: performing (704) synchronization and estimation comprises combining (704-1) the PDCCH transmission received according to the two or more TCI states (e.g., MRC or MMSE) before PDCCH decoding.

Embodiment 8: the method also includes receiving (700) an explicit (e.g., via RRC) or implicit (e.g., CORESET activated with two or more TCI states) configuration for enabling SFN based PDCCH diversity.

Embodiment 9: A method performed by a base station for enabling Single Frequency Network, SFN, based Physical Downlink Control Channel, PDCCH, diversity. The method includes activating (802) a first number (≥2) of Transmit Configuration Indicator, TCI, states for a Control Resource Set, CORESET. The method also includes transmitting (804) a PDCCH according to a second number (≥2) of TCI states activated for the CORESET in a same time and frequency resource (e.g., Control Channel Element, CCE), wherein the second number of TCI states is less than or equal to the first number of TCI states.

Embodiment 10: the second number of TCI states is a subset of the first number of TCI states.

Embodiment 11: each of the second number of TCI states corresponds to a respective Transmission/Reception Point, TRP.

Embodiment 12: each of the second number of TCI states corresponds to a respective beam transmitted from a same TRP.

Embodiment 13: transmitting (804) the PDCCH according to the second number of TCI states comprises transmitting (804-1) the PDCCH concurrently according to the second number of TCI states.

Embodiment 14: transmitting (804) the PDCCH according to the second number of TCI states comprises transmitting (804-2) a Tracking Reference Signal, TRS, or a Synchronization Signal Block, SSB, according to each of the second number of TCI states.

Embodiment 15: the method also includes providing (800) an explicit (e.g., via RRC) or implicit (e.g., CORESET activated with two or more TCI states) configuration to a wireless device for enabling SFN based PDCCH diversity.

Embodiment 16: A wireless device for enabling Single Frequency Network, SFN, based Physical Downlink Control Channel, PDCCH, diversity. The wireless device includes processing circuitry configured to perform any of the steps of any of the embodiments performed by the wireless device and power supply circuitry configured to supply power to the wireless device.

Embodiment 17: A base station for enabling Single Frequency Network, SFN, based Physical Downlink Control Channel, PDCCH, diversity. The base station includes processing circuitry configured to perform any of the steps of any of the embodiments performed by the base station and power supply circuitry configured to supply power to the base station.

Embodiment 18: A User Equipment, UE, for enabling Single Frequency Network, SFN, based Physical Downlink Control Channel, PDCCH, diversity. The UE includes an antenna configured to send and receive wireless signals. The UE also includes radio front-end circuitry connected to the antenna and to processing circuitry and configured to condition signals communicated between the antenna and the processing circuitry. The processing circuitry being configured to perform any of the steps of any of the embodiments performed by the wireless device. The UE also includes an input interface connected to the processing circuitry and configured to allow input of information into the UE to be processed by the processing circuitry, an output interface connected to the processing circuitry and configured to output information from the UE that has been processed by the processing circuitry, and a battery connected to the processing circuitry and configured to supply power to the UE.

Embodiment 19: A communication system including a host computer comprising processing circuitry configured to provide user data and a communication interface configured to forward the user data to a cellular network for transmission to a User Equipment, UE. The cellular network comprises a base station having a radio interface and processing circuitry, the base station's processing circuitry configured to perform any of the steps of any of the embodiments performed by the base station.

Embodiment 20: the communication system further including the base station.

Embodiment 21: the communication system further including the UE, wherein the UE is configured to communicate with the base station.

Embodiment 22: the processing circuitry of the host computer is configured to execute a host application, thereby providing the user data and the UE comprises processing circuitry configured to execute a client application associated with the host application.

Embodiment 23: A method implemented in a communication system including a host computer, a base station, and a User Equipment, UE. The method includes at the host computer, providing user data. The method also includes at the host computer, initiating a transmission carrying the user data to the UE via a cellular network comprising the base station, wherein the base station performs any of the steps of any of the embodiments performed by the base station.

Embodiment 24: the method also includes at the base station, transmitting the user data.

Embodiment 25: the user data is provided at the host computer by executing a host application, the method further comprising, at the UE, executing a client application associated with the host application.

Embodiment 26: A User Equipment, UE, configured to communicate with a base station, the UE comprising a radio interface and processing circuitry configured to perform the method of the previous 3 embodiments.

Embodiment 27: A communication system including a host computer comprising processing circuitry configured to provide user data and a communication interface configured to forward user data to a cellular network for transmission to a User Equipment, UE. The UE comprises a radio interface and processing circuitry, the UE's components configured to perform any of the steps of any of the embodiments performed by the wireless device.

Embodiment 28: the cellular network further includes a base station configured to communicate with the UE.

Embodiment 29: the processing circuitry of the host computer is configured to execute a host application, thereby providing the user data and the UE's processing circuitry is configured to execute a client application associated with the host application.

Embodiment 30: A method implemented in a communication system including a host computer, a base station, and a User Equipment, UE. The method includes at the host computer, providing user data. The method also includes at the host computer, initiating a transmission carrying the user data to the UE via a cellular network comprising the base station, wherein the UE performs any of the steps of any of the embodiments performed by the wireless device.

Embodiment 31: the method also includes at the UE, receiving the user data from the base station.

Embodiment 32: A communication system including a host computer comprising communication interface configured to receive user data originating from a transmission from a User Equipment, UE, to a base station. The UE comprises a radio interface and processing circuitry, the UE's processing circuitry configured to perform any of the steps of any of the embodiments performed by the wireless device.

Embodiment 33: the communication system further including the UE.

Embodiment 34: the communication system further including the base station, wherein the base station comprises a radio interface configured to communicate with the UE and a communication interface configured to forward to the host computer the user data carried by a transmission from the UE to the base station.

Embodiment 35: the processing circuitry of the host computer is configured to execute a host application and the UE's processing circuitry is configured to execute a client application associated with the host application, thereby providing the user data.

Embodiment 36: the processing circuitry of the host computer is configured to execute a host application, thereby providing request data and the UE's processing circuitry is configured to execute a client application associated with the host application, thereby providing the user data in response to the request data.

Embodiment 37: A method implemented in a communication system including a host computer, a base station, and a User Equipment, UE. The method includes at the host computer, receiving user data transmitted to the base station from the UE, wherein the UE performs any of the steps of any of the embodiments performed by the wireless device.

Embodiment 38: the method also includes, at the UE, providing the user data to the base station.

Embodiment 39: the method also includes at the UE, executing a client application, thereby providing the user data to be transmitted and at the host computer, executing a host application associated with the client application.

Embodiment 40: the method also includes at the UE, executing a client application and at the UE, receiving input data to the client application, the input data being provided at the host computer by executing a host application associated with the client application. The user data to be transmitted is provided by the client application in response to the input data.

Embodiment 41: A communication system including a host computer comprising a communication interface configured to receive user data originating from a transmission from a User Equipment, UE, to a base station. The base station comprises a radio interface and processing circuitry, the base station's processing circuitry configured to perform any of the steps of any of the embodiments performed by the base station.

Embodiment 42: the communication system further including the base station.

Embodiment 43: the communication system further including the UE, wherein the UE is configured to communicate with the base station.

Embodiment 44: the processing circuitry of the host computer is configured to execute a host application and the UE is configured to execute a client application associated with the host application, thereby providing the user data to be received by the host computer.

Embodiment 45: A method implemented in a communication system including a host computer, a base station, and a User Equipment, UE. The method includes at the host computer, receiving, from the base station, user data originating from a transmission which the base station has received from the UE, wherein the UE performs any of the steps of any of the embodiments performed by the wireless device.

Embodiment 46: the method also includes at the base station, receiving the user data from the UE.

Embodiment 47: the method also includes at the base station, initiating a transmission of the received user data to the host computer.

Embodiment 48: A method of transmitting a Physical Downlink Control Channel, PDCCH, over two or more Transmission/Reception Points, TRPs, and/or two or more beams from a same TRP, in a Control Resource Set, CORESET, in a wireless network consisting of at least a wireless node and at least a User Equipment, UE. The method comprising Activating, by the wireless node, two or more TCI states, each associated with one TRP, for the CORESET; Transmitting to the UE the PDCCH over the two or more TRPs in a same time and frequency resource; and Receiving by the UE the PDCCH according to the two or more activated TCI states.

Embodiment 49: the CORESET comprises a number of Physical Resource Blocks, PRBs, and a number of Orthogonal Frequency Division Multiplexing, OFDM, symbols.

Embodiment 50: the CORESET further comprises a number of Control Channel Elements, CCEs, each comprising a number of Resource Group, REG, bundles.

Embodiment 51: the PDCCH may be pre-coded differently over different TRPs with a precoding granularity in REG bundle (e.g., a same precoder is applied within each REG bundle).

Embodiment 52: the PDCCH may be applied with a different phase factor over different TRPs in each REG bundle.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BWP Bandwidth Part
CCE Control-Channel Elements
CE Control Element
CORESET Control Resource Set
CP Cyclic Prefix
CPU Central Processing Unit
CSI Channel State Information
CSS Common Search Space
DCI Downlink Control Information
DFT Discrete Fourier Transform
DL Downlink
DMRS Demodulation Reference Signal
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IE Information Element
IoT Internet of Things
IP Internet Protocol
LTE Long Term Evolution
MAC Medium Access Control
MBSFN Multicast Broadcast Single Frequency Network
MIMO Multiple-Input-Multiple-Output
MME Mobility Management Entity
MTC Machine Type Communication
NEF Network Exposure Function
NF Network Function
NR New Radio
NRF Network Function Repository Function
NSSF Network Slice Selection Function
OFDM Orthogonal Frequency Division Multiplexing
OTT Over-the-Top
PC Personal Computer
PCF Policy Control Function
PDCCH Physical Downlink Control Channel
PDSCH Physical Downlink Shared Channel
P-GW Packet Data Network Gateway
PUSCH Physical Uplink Shared Channel
QCL Quasi Co-Located
QoS Quality of Service
RAM Random Access Memory
RAN Radio Access Network
RB Resource Block
RE Resource Element
REG Resource Element Group
ROM Read Only Memory
RRC Radio Resource Control
RRH Remote Radio Head
RS Reference Signal
RTT Round Trip Time
SCEF Service Capability Exposure Function
SMF Session Management Function
SSB Synchronization Signal Block
USS UE Specific Search Space
TB Transport Block
TCI Transmit Configuration Indicator
TRP Transmission/Reception Points
UDM Unified Data Management
UE User Equipment
UPF User Plane Function
URLLC Ultra-Reliable Low Latency Those skilled in the art will recognize improvements and modifications to the embodiments of the present disclosure. All such improvements and modifications are considered within the scope of the concepts disclosed herein.

The invention claimed is:

1. A method performed by a wireless device, comprising:
receiving a configuration for Single Frequency Network, SFN, based Physical Downlink Control Channel, PDCCH, transmission; and
receiving a PDCCH transmission in a Control Resource Set, CORESET, the receiving comprising receiving a Demodulation Reference Signal (DMRS) having a DMRS port associated with the PDCCH transmission, wherein the PDCCH transmission is repeated in a same Control Channel Element, CCE, of the CORESET according to two or more Transmit Configuration Indicator, TCI, states activated for the CORESET,
wherein each TCI state of the two or more TCI states is associated with a respective Transmission/Reception Point (TRP).

2. The method of claim 1, wherein receiving the configuration comprises receiving a Medium Access Control, MAC, Control Element, CE, command activating the two or more TCI states for the CORESET.

3. The method of claim 1, wherein receiving the configuration comprises receiving a Medium Access Control, MAC, Control Element, CE, command activating a plurality of TCI states for the CORESET and a Downlink Control Information, DCI, message activating the two or more TCI states among the plurality of TCI states.

4. The method of claim 1, wherein receiving the PDCCH transmission comprises receiving the PDCCH transmission concurrently in a same time and frequency resource in the CORESET according to the two or more TCI states activated for the CORESET.

5. The method of claim 4, wherein the time and frequency resource in the CORESET comprises a set of Control Channel Elements, CCEs, each comprising a plurality of resource elements or symbols.

6. The method of claim 1, further comprising receiving one or more downlink reference signals configured in each of the two or more TCI states activated for the CORESET prior to receiving the PDCCH transmission.

7. The method of claim 6, wherein each of the one or more downlink reference signals is a Quasi Co-Located, QCL, source reference signal for the DMRS with respect to one of QCL types A, B, C, and D.

8. The method of claim 7, wherein one of the one or more downlink reference signals is an QCL source reference signal with respect to QCL type D.

9. The method of claim 7, wherein each of the one or more downlink reference signals is one of a Tracking Reference Signal, TRS, a Synchronization Signal Block, SSB, and a Channel State Information-Reference Signal, CSI-RS.

10. The method of claim 6, further comprising performing one or more actions according to the two or more TCI states prior to PDCCH decoding.

11. The method of claim 10, wherein performing one or more actions comprises performing synchronization and estimation of channel properties associated with each of the two or more TCI states based on one or more downlink reference signals configured in a respective one of the two or more TCI states.

12. The method of claim 11, wherein the channel properties comprise one or more of average delay, delay spread, Doppler shift, Doppler spread, and spatial receive filter.

13. The method of claim 10, wherein performing one or more actions comprises one or more of:
receiving the PDCCH transmission with two or more receive beams each associated with a respective one of the two or more TCI states;
performing channel estimation based on a Demodulation Reference Signal, DMRS, associated with the PDCCH transmission in the CORESET by assuming that a DMRS port is Quasi Co-Located, QCL, with the one or more downlink reference signals configured in each of the two or more TCI states activated for the CORESET; and
combining the PDCCH transmission received with the two or more receive beams.

14. The method of claim 1, wherein receiving the configuration comprises receiving an explicit configuration via Radio Resource Control, RRC, signaling.

15. The method of claim 1, wherein receiving the configuration comprises receiving an implicit configuration in response to the CORESET being activated with the two or more TCI states.

16. A wireless device comprising processing circuitry configured to cause the wireless device to:
receive a configuration for Single Frequency Network, SFN, based Physical Downlink Control Channel, PDCCH, transmission; and
receive a PDCCH transmission in a Control Resource Set, CORESET, the receiving comprising receiving a Demodulation Reference Signal (DMRS) having a DMRS port associated with the PDCCH transmission,
wherein the PDCCH transmission is repeated in a same Control Channel Element, CCE, of the CORESET according to two or more Transmit Configuration Indicator, TCI, states activated for the CORESET,
wherein each TCI state of the two or more TCI states is associated with a respective Transmission/Reception Point (TRP).

17. A method performed by a base station, comprising:
transmitting a configuration for Single Frequency Network, SFN, based Physical Downlink Control Channel, PDCCH, transmission, the transmitting comprising transmitting a Demodulation Reference Signal (DMRS) having a DMRS port associated with the PDCCH transmission; and
transmitting a PDCCH transmission in a Control Resource Set, CORESET,
wherein the PDCCH transmission is repeated in a same Control Channel Element, CCE, of the CORESET according to two or more Transmit Configuration Indicator, TCI, states activated for the CORESET,
wherein each TCI state of the two or more TCI states is associated with a respective Transmission/Reception Point (TRP).

18. The method of claim 17, wherein transmitting the configuration comprises transmitting a Medium Access Control, MAC, Control Element, CE, command activating the two or more TCI states for the CORESET.

19. The method of claim 17, wherein transmitting the configuration comprises transmitting a Medium Access Control, MAC, Control Element, CE, command activating a plurality of TCI states for the CORESET and a Downlink Control Information, DCI, message activating the two or more TCI states among the plurality of TCI states.

20. The method of claim 17, wherein transmitting the PDCCH transmission comprises transmitting the PDCCH transmission concurrently in a same time and frequency resource in the CORESET according to the two or more TCI states activated for the CORESET.

21. The method of claim 20, wherein the time and frequency resource in the CORESET comprises a set of Control Channel Elements, CCEs, each comprising a plurality of resource elements or symbols.

22. The method of claim 17, further comprising transmitting one or more downlink reference signals configured in each of the two or more TCI states activated for the CORESET prior to transmitting the PDCCH transmission.

23. A base station comprising processing circuitry configured to cause the base station to:
transmit a configuration for Single Frequency Network, SFN, based Physical Downlink Control Channel, PDCCH, transmission, the transmitting comprising transmitting a Demodulation Reference Signal (DMRS) having a DMRS port associated with the PDCCH transmission; and
transmit a PDCCH transmission in a Control Resource Set, CORESET,
wherein the PDCCH transmission is repeated in a same Control Channel Element, CCE, of the CORESET according to two or more Transmit Configuration Indicator, TCI, states activated for the CORESET,
wherein each TCI state of the two or more TCI states is associated with a respective Transmission/Reception Point (TRP).

* * * * *